(12) United States Patent
Villarroel Humérez et al.

(10) Patent No.: US 12,517,703 B2
(45) Date of Patent: Jan. 6, 2026

(54) ARTIFICIAL INTELLIGENCE APPROACH TO SOLVING INDUSTRIAL DATA TRANSFORMATION PROBLEMS

(71) Applicant: Schneider Electric Systems USA, Inc., Foxboro, MA (US)

(72) Inventors: José Gabriel Villarroel Humérez, Universal City, TX (US); Ondrej Taranda, Bratislava (SK); Tamer Omran Hussein Omran, Cairo (EG)

(73) Assignee: Schneider Electric Systems USA, Inc.

( * ) Notice: Subject to any disclaimer, the term of this patent is extended or adjusted under 35 U.S.C. 154(b) by 535 days.

(21) Appl. No.: 17/863,343

(22) Filed: Jul. 12, 2022

(65) Prior Publication Data

US 2023/0016615 A1 Jan. 19, 2023

Related U.S. Application Data

(60) Provisional application No. 63/220,710, filed on Jul. 12, 2021.

(51) Int. Cl.
*G06F 8/20* (2018.01)
*G05B 13/02* (2006.01)
(Continued)

(52) U.S. Cl.
CPC .......... *G06F 8/22* (2013.01); *G05B 13/0265* (2013.01); *G06F 8/33* (2013.01); *G06F 9/453* (2018.02); *G06N 20/00* (2019.01)

(58) Field of Classification Search
CPC .............. G06F 8/22; G06F 8/33; G06F 9/453; G06N 20/00; G05B 13/0265
(Continued)

(56) References Cited

U.S. PATENT DOCUMENTS 7,415,448 B2 * 8/2008 Thota ..................... G06F 16/29
  706/47
8,700,378 B1 4/2014 Lin
(Continued)

FOREIGN PATENT DOCUMENTS

WO 2019204106 A1 10/2019
WO 2020201835 A1 10/2020

OTHER PUBLICATIONS

Mishra, Sukumar, C. N. Bhende, and B. K. Panigrahi. "Detection and classification of power quality disturbances using S-transform and probabilistic neural network." IEEE Transactions on power delivery 23.1 (2007): pp. 280-287. (Year: 2007).*
(Continued)

*Primary Examiner* — Satish Rampuria
(74) *Attorney, Agent, or Firm* — FIG. 1 Patents

(57) ABSTRACT

A method of using artificial intelligence (AI) for solving industrial data transformation problems, including receiving in a first iteration an initial transformation set and in at least one respective subsequent iteration a trained transformation set, each of the initial and trained transformation sets having components that include input and target datasets and a process flow for transforming the input dataset into the target dataset, wherein the trained transformation set uses training data generated using AI tools that modifies at least one of the components of a transformation set from a previous iteration. For each iteration the components of the trained transformation set are compared to corresponding components of trained transformation sets of previous iterations and to intersecting data stored from executions using the corresponding components. A trained transformation set for solving the industrial data transformation problem is selected if a suitable match is found based on the comparison.

24 Claims, 14 Drawing Sheets

(51) Int. Cl.
 G06F 8/33 (2018.01)
 G06F 9/451 (2018.01)
 G06N 20/00 (2019.01)
(58) Field of Classification Search
 USPC .................................................. 717/113–178
 See application file for complete search history.

(56) References Cited

U.S. PATENT DOCUMENTS

| | | | |
|---|---|---|---|
| 9,565,275 B2* | 2/2017 | Lawson | H04L 67/10 |
| 9,940,127 B1 | 4/2018 | Lee et al. | |
| 11,373,121 B2* | 6/2022 | Gottula | G06N 5/02 |
| 11,468,350 B2* | 10/2022 | Dalli | G06N 5/048 |
| 11,715,037 B2* | 8/2023 | Bhide | G06F 16/20 |
| | | | 706/12 |
| 12,271,788 B2* | 4/2025 | Daly | G06N 20/00 |
| 2007/0239648 A1* | 10/2007 | Thota | G06F 40/143 |
| | | | 706/47 |
| 2010/0082133 A1 | 4/2010 | Chouinard et al. | |
| 2015/0149491 A1 | 5/2015 | Redlich et al. | |
| 2016/0154656 A1 | 6/2016 | Illindala et al. | |
| 2016/0274995 A1 | 9/2016 | Klein | |
| 2017/0064013 A1 | 3/2017 | Totale et al. | |
| 2017/0090893 A1 | 3/2017 | Aditya et al. | |
| 2018/0165606 A1* | 6/2018 | Brooks | G06N 20/00 |
| 2019/0265971 A1 | 8/2019 | Behzadi et al. | |
| 2020/0050968 A1* | 2/2020 | Lee | G06N 20/00 |
| 2020/0103843 A1 | 4/2020 | Stump et al. | |
| 2020/0326684 A1* | 10/2020 | Chand | G05B 23/024 |
| 2020/0394264 A1 | 12/2020 | Saraya et al. | |
| 2021/0064955 A1* | 3/2021 | Gill | G06V 10/82 |
| 2021/0089278 A1 | 3/2021 | Dunn et al. | |
| 2021/0149644 A1 | 5/2021 | Kawanaka et al. | |
| 2021/0192412 A1 | 6/2021 | Krishnaswamy | |
| 2022/0215267 A1* | 7/2022 | Oster | G06N 3/049 |
| 2023/0108808 A1 | 4/2023 | Lerman | |

OTHER PUBLICATIONS

Guimarães Santos, Celso Augusto, and Gustavo Barbosa Lima da Silva. "Daily streamflow forecasting using a wavelet transform and artificial neural network hybrid models." Hydrological Sciences Journal 59.2 (2014): pp. 312-324. (Year: 2014).*

Meireles, Magali RG, Paulo EM Almeida, and Marcelo Godoy Simões. "A comprehensive review for industrial applicability of artificial neural networks." IEEE transactions on industrial electronics 50.3 (2003): pp. 585-601. (Year: 2003).*

Ulas, Dilber. "Digital transformation process and SMEs." Procedia computer science 158 (2019): pp. 662-671. (Year: 2019).*

Ge, Zhiqiang, et al. "Data mining and analytics in the process industry: The role of machine learning." Ieee Access 5 (2017): pp. 20590-20616. (Year: 2017).*

Brunetti, Federico, et al. "Digital transformation challenges: strategies emerging from a multi-stakeholder approach." The TQM Journal 32.4 (2020): pp. 697-724. (Year: 2020).*

Peres, Ricardo Silva, et al. "Industrial artificial intelligence in industry 4.0-systematic review, challenges and outlook." IEEE access 8 (2020): pp. 220121-220139. (Year: 2020).*

Wang, Weiyu, and Keng Siau. "Artificial intelligence, machine learning, automation, robotics, future of work and future of humanity: A review and research agenda." Journal of Database Management (JDM) 30.1 (2019): pp. 61-79. (Year: 2019).*

Buchmeister, Borut, Iztok Palcic, and Robert Ojstersek. "Artificial intelligence in manufacturing companies and broader: An overview." DAAAM International scientific book (2019): pp. 81-98. (Year: 2029).*

Bravo et al., "A groupware system to support collaborative programming: Design and experiences," The Journal of Systems and Software, 2013, vol. 86, pp. 1759-1771.

Dave, K., "Comparison of Flow-Based versus Block-Based Programming for Naive Programmers," Master's Thesis, Ryerson University, 2018, 170 pages.

International Search Report and Written Opinion in PCT/US2022/036820, mailed Nov. 3, 2022, 10 pages.

International Search Report and Written Opinion in PCT/US2022/036846, mailed Nov. 15, 2022, 8 pages.

Lopez et al., "Ciclope Robot: Web-Based System to Remote Program an Embedded Real-Time System," IEEE Transactions on Industrial Electronics, Dec. 2009, vol. 56, No. 12, pp. 4791-4797.

Semeliker, A., "Development of a grapical user interface for programming ROS-based robots," Master Thesis, TU Wien Faculty of Electrical Engineering and Information Technology Automation and Control Institute, 2019, 131 pages.

International Search Report and Written Opinion for PCT Application No. PCT/US2022/036831, dated Nov. 8, 2022.

Extended European Search Report for European Patent Application No. 22842761.3, dated Apr. 3, 2025.

* cited by examiner

ARTIFICIAL INTELLIGENCE APPROACH TO SOLVING INDUSTRIAL DATA TRANSFORMATION PROBLEMS

CROSS REFERENCE TO RELATED APPLICATIONS

This application claims priority to U.S. Provisional Patent Application Ser. No. 63/220,710 filed Jul. 12, 2021, which is incorporated herein by reference in its entirety.

TECHNICAL FIELD

The present disclosure relates to collaborative environment that provides solutions related to data transformation focused on industrial data manipulation. It includes a simple development environment that facilitates the design of these solutions.

BACKGROUND

In complex systems, data can be shared between different applications that use different parameters, formats, data structures, and/or programming languages. Engineers require expertise in order to enable the sharing of data between different applications. Incompatibilities can arise that require a solution. Engineers may invest considerable resources into developing a solution.

The solution may be implemented transparently, undocumented and without being discovered by colleagues that may need a similar solution. Similar solutions may also be implemented by other engineers throughout the company, e.g., for similar data transformation tasks, leading to inefficiencies and "re-inventing the wheel". In addition, these solutions can be applied by others with various levels of success, without authors of the solutions being aware of successes or failures. Additionally, without feedback, the success and failure of application of the solution can be untapped for improving the solution.

Furthermore, while a released solution to a data transformation problem can be suitable for most concrete situations, very often there is a need to customize the solution to fulfill requirements of the particular data transformation problem at hand. Customization of the solution can be complex and time consuming when a user of the solution requests customization from an author of the solution via conventional channels, even for implementation of a small change. The author or engineer implementing the change needs to have the requisite level of skill and access to the software applications and programming languages needed. Expensive licensing fees may be required to use these software applications. The development and customization process can be tedious, requiring manual handling for extracting information from certain datasets, such as graphic datasets, may need manual handling for extracting information.

Once source code of a software program has been developed by a developer, the software program can be released by the developer and installed by a user. The user may have specific needs that are not met by the software program. For example, a user may want to change an algorithm included in the source code to execute properly with a particular type of data. However, typically the user does not have access to modify the source code. Rather, a new version of the software program with the updated algorithm would need to be released by the developer and installed by the user.

From the developer's point of view, the developer can use a development platform to write and edit the source code. The developer can execute the software program, such as for testing newly edited source code. However each time the source code is changed, the developer must recompile the software program before executing it.

During testing, for example, the developer may identify during execution a segment of the source code that is causing an unwanted effect and determine that a revision is needed to the segment. The developer then exits execution of the software program, revises the segment, recompiles the software program, and restarts execution of the software program from the beginning. This means that the developer must wait until the restarted software program reaches execution of the segment in order to test the segment. If the developer is not satisfied with results of testing the segment and chooses to further modify the segment, the entire process of stopping execution, editing the segment, recompiling the software program, and executing the software program from the beginning is repeated. While conventional methods and systems have generally been considered satisfactory for their intended purpose, there is still a need in the art for sharing of solutions to industrial data transformation problems. Further, there is still a need for sharing successes and failures when applying the solution for purposes of revising the solution. In addition, there is still a need in the art for utilizing information related to successes and failures when applying the solution for developing related solutions. What is more, there is still a need in the art for reducing complexity, skill and license requirements, and manual performance of tasks for extracting information from datasets. Further, there is still a need in the art to simplify transitions from development to testing or execution of a software application. The present disclosure provides a system and method for addressing these challenges.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method implemented by a computer system using artificial intelligence (AI) for solving industrial data transformation problems. The method includes receiving in a first iteration an initial transformation set and in at least one respective subsequent iteration a trained transformation set, each of the initial and trained transformation sets having components that include an input dataset, a target dataset, and a process flow for transforming the input dataset into the target dataset, wherein the trained transformation set uses training data that was generated using AI tools that modifies at least one of the components of the of a transformation set from a previous iteration. The method further includes, for each iteration, comparing the components of the trained transformation set to corresponding components of trained transformation sets of previous iterations and to intersecting data using the corresponding components of history data stored from execution or development of process flows over time. A trained transformation set is selected for solving the industrial data transformation problem if a suitable match is found based on the comparison.

In one or more embodiments, for each iteration, ML tools can be applied to the trained transformation set to propose ML solutions that model transformation sets, and convergence can be sought for the ML solutions.

In one or more embodiments, the method can further include validating the converged ML solutions. If the suitable match is not found, the validation is not successful, or the convergence fails, the AI tools can be applied to generate training data for a next iteration.

In one or more embodiments, the method can further include, for each iteration, receiving user feedback when available, wherein the user feedback indicates whether the initial or trained transformation set corresponding to the iteration is acceptable to a user, and the user feedback is stored in association with the initial or trained transformation set and used for solving subsequent industrial data transformation problems.

In one or more embodiments, the history data can include one or more of output data from execution of process flows by a community of users over time, logged data about experiences of the community of users developing or executing process flows over time, and application data about intermediate results when developing or executing process flows over time.

In one or more embodiments, the AI tools can identify fundamental variables of the transformation set that most influence convergence and/or validation.

In one or more embodiments, the identification of fundamental variables can use a Latin Square algorithm.

In one or more embodiments, the AI tools can use neural networks to identify and modify the transformation set.

In one or more embodiments, the AI tools can include one or more of MS Cognitive Toolkit, PyTorch, and TensorFlow, and the ML tools can include one or more of ML.Net, PyTorch, and Accord.Net.

In one or more embodiments, the convergence can use at least one of matrix analysis, Gaussian transforms, Fourier or fast Fourier transforms, La Place transforms, and matrix analysis.

In one or more embodiments, a process flow of a transformation set can include at least first and second programming blocks, the first and second programming blocks each having an input block and an output block, wherein the first and second programming blocks are compatible for an execution designation that the first and second programming blocks are to be executed consecutively during execution when the output block of the first programming block is compatible for passing data to the input block of the second programming block. The method can further include selecting one of the first and second programming blocks to recommend to the user from candidate programming blocks based on a probability of compatibility for passing data during execution between the output block of the first programming block and the input block of the second programming block.

In one or more embodiments, the method can further include applying machine learning to determine the probability of compatibility.

In one or more embodiments, the method can further include determining an opportunity for recommending the one of the first and second programming blocks based on a determination about user behavior and/or user actions during development or execution of the other of the first and second programming blocks and/or execution problems encountered during execution of the other of the first and second programming blocks.

In one or more embodiments, the log data associated with a programming block or process flow can include at least one of time stamped information associated with development or execution of the programming block or process flow per user about user action data, user behavior data, warning data, error and/or success data, user feedback data, content of any associated dialogs, and the application data includes at least one of input data and intermediate and/or temporary information data generated during development or execution of a programming block or process flow.

In one or more embodiments, the user behavior data can be based on user interaction with the GUI when developing or executing a process flow or programming block.

In one or more embodiments, the method can further include receiving interrupt signals from a user input device (UID), wherein the user interaction with the GUI is determined from the interrupt signals.

In one or more embodiments, the user behavior can be further determined using machine learning to determine user sentiment based on correlations between user interaction with the GUI and the log data and/or application data.

In one or more embodiments, the method can further include notifying an author user that developed a programming block or process flow about log data and/or application data indicative of problems encountered by other users during execution of the programming block or process flow.

In one or more embodiments, the input dataset of the trained transformation set can include a graphical dataset and the process flow of the trained transformation set is configured to perform optical graphical character recognition (OGCR) on the graphical dataset. The method can further include suggesting by at least one of the AI tools and the ML tools an upscaling factor for upscaling the graphical dataset and configuring the process flow of the trained transformation set to generate an intermediary dataset that is upscaled based on the upscaling factor and to perform the OGCR on the intermediary dataset.

In one or more embodiments, the intermediary dataset can be a vector graphics dataset or a prober vector graphics dataset. In one or more embodiments, the method can be performed autonomously.

In one or more embodiments, the method can further include autonomously providing a next initial transformation set, autonomously repeating the method with the next initial transformation set.

In a further aspect, disclosed is a method implemented by a computer system using artificial intelligence (AI) for solving industrial data transformation problems. The method includes a. receiving in a first iteration an initial transformation set including an input set, a target dataset, and a process flow for transforming the input dataset into the target dataset, the process flow being obtained from at least one dictionary in a first iteration; b. receiving in at least one respective subsequent iteration a trained transformation set using training data that modifies at least one of the input dataset, the target dataset, and the process flow of a transformation set from a previous iteration; and c. for each iteration of the at least one respective subsequent iteration: c1. receiving user feedback when available, the user feedback indicating whether the initial or trained transformation set corresponding to the iteration is acceptable to a user; c2. updating a valid results database with the user feedback, if received, in association with the corresponding initial or trained transformation set; c3. if user feedback indicating that the process flow was unacceptable, or responsive to not receiving user feedback, seeking a match between results in the valid results database and intersecting data from training data previously generated over time, output data from execution of process flows by the community of users over time, logged data about experiences of the community of users developing or executing process flows over time, and application data about intermediate results when developing or executing process flows over time; c4. if a match is found, proposing machine learning (ML) solutions using ML tools until convergence can be found for an ML solution transformation set; c5. if convergence is found for the ML solution transformation set, validating the ML solution transformation set based on whether or not it matches data in the valid results database; c6. if the validation is successful, updating the validation results database to indicate successful convergence and validation, updating the training data and at least one dictionary to include the ML solution transformation set as available for current use and for future use to find program flows as solutions to data transformation problems; and c7. if the match is not found in step c3, the validation is not successful at step c5, or the convergence fails, c7a. using AI tools to generate the training data to modify at least one of the process flow, input dataset, and target dataset of a next trained transformation set; and c6b. providing the next trained transformation set to be the trained transformation set received at operation b.

In another aspect, disclosed is a transformation system that includes a memory configured to store a plurality of programmable instructions and at least one processing device in communication with the memory. The at least one processing device, upon execution of the plurality of programmable instructions is configured to perform any of the disclosed methods.

In a further aspect, disclosed is a non-transitory computer readable storage medium having one or more computer programs embedded therein. When executed by a computer system, the computer system is caused to perform any of the disclosed methods.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1A:
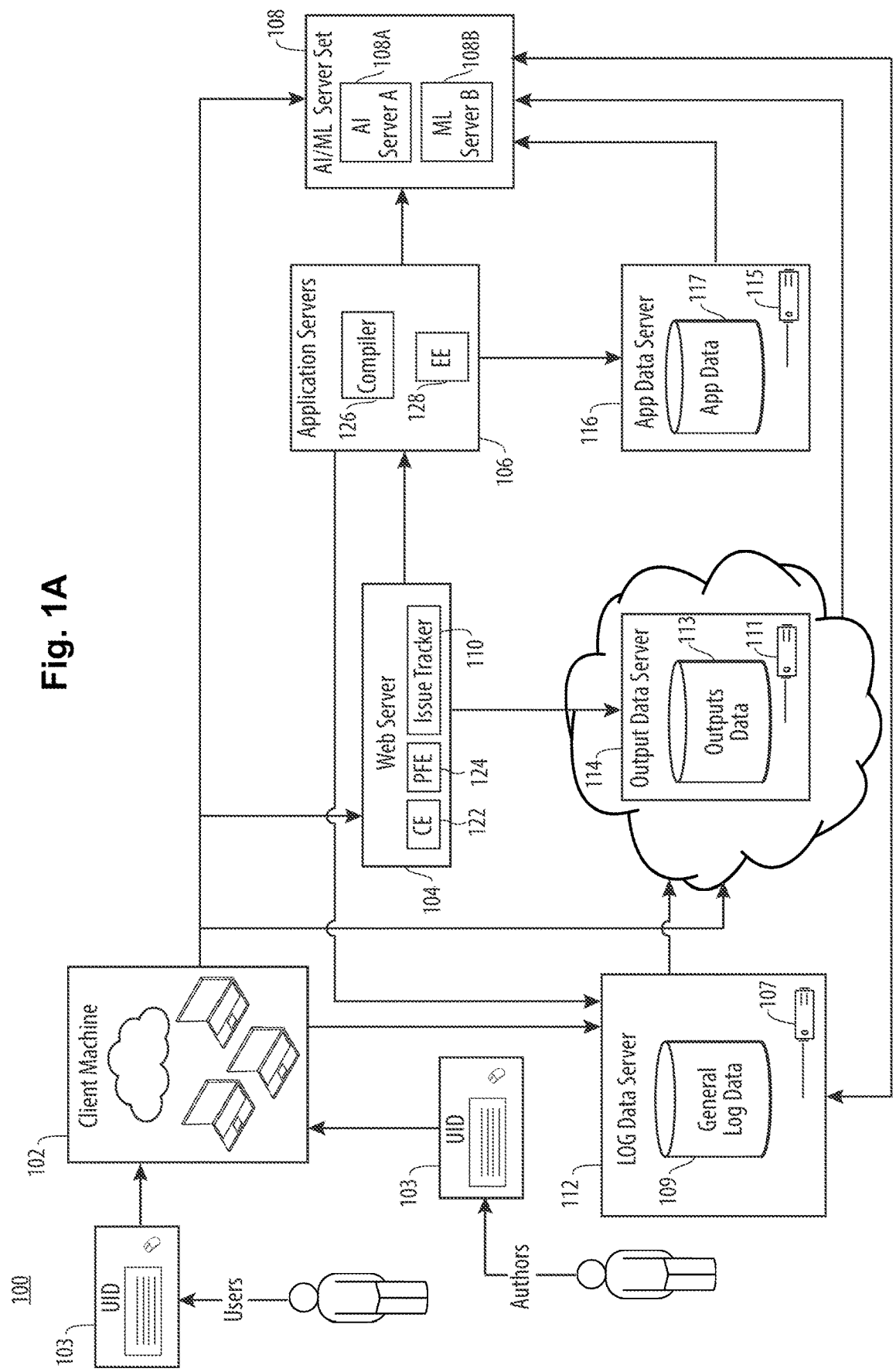
FIG. 1A is a block diagram illustrating an example infrastructure of a data transformation system, including components and data flow, in accordance with embodiments of the disclosure.
Figure 1B:
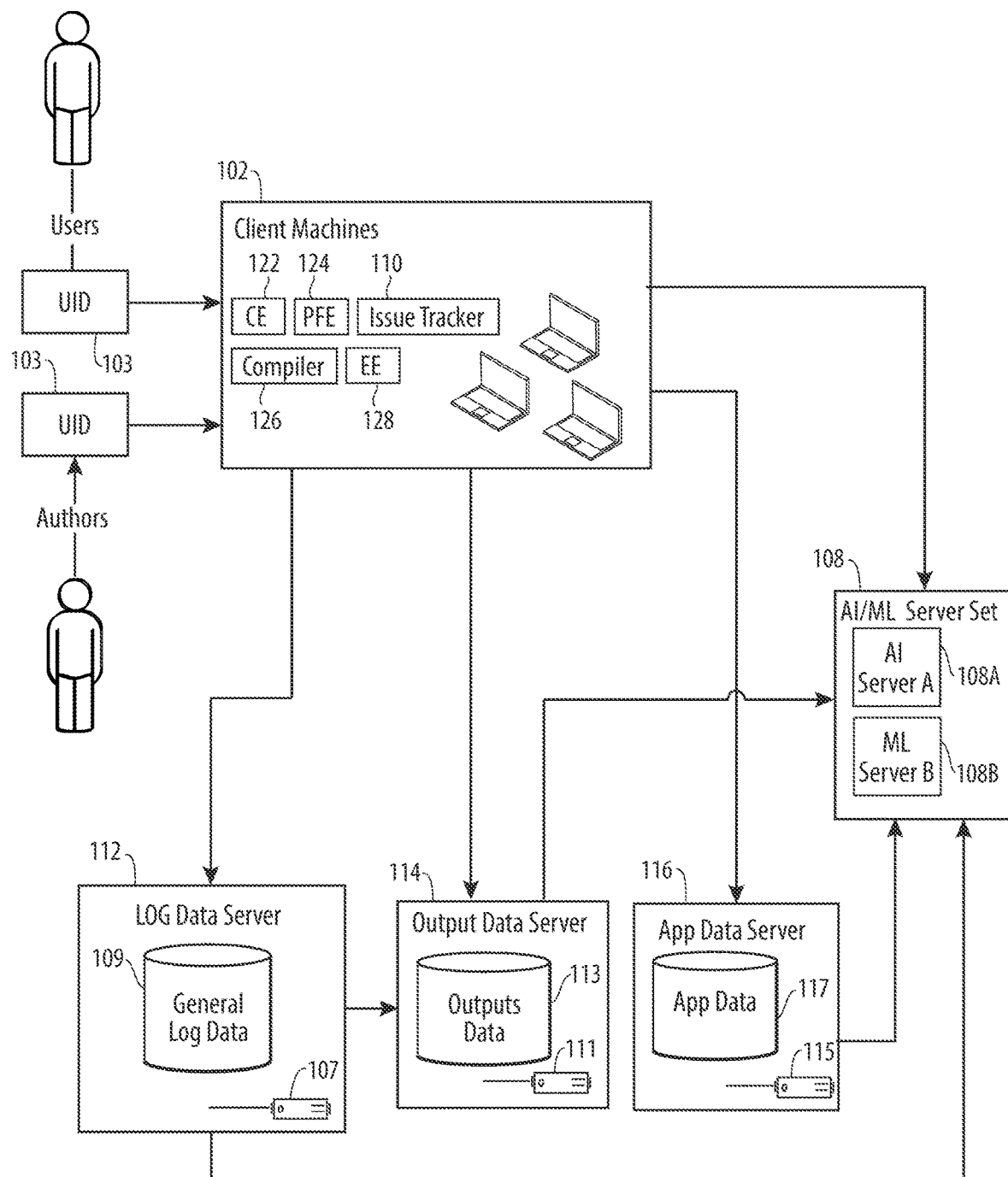
FIG. 1B is a block diagram illustrating an example infrastructure of a software execution platform, including components and data flow, in accordance with embodiments of the disclosure.
Figure 1C:
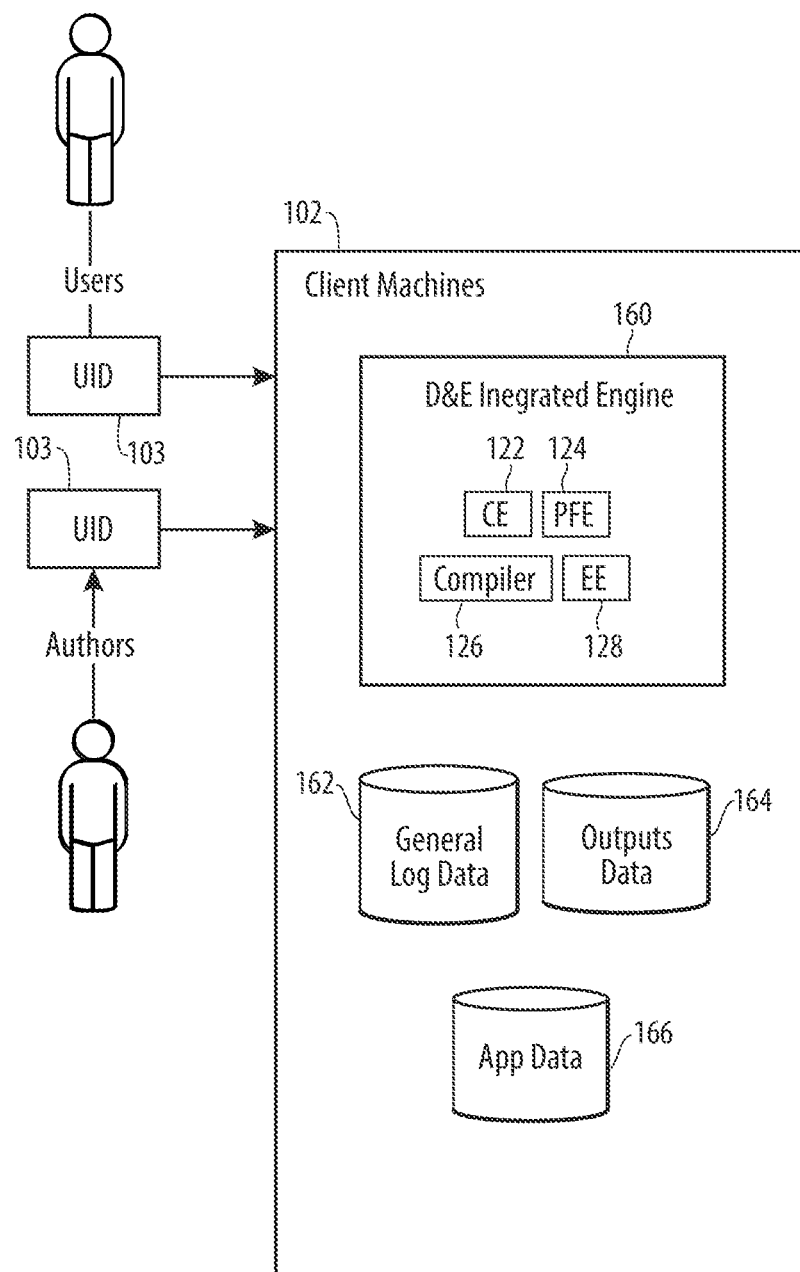
FIG. 1C is a block diagram illustrating an example infrastructure of data transformation system, including components and data flow, in accordance with further embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of an infrastructure of a data transformation system in accordance with the disclosure is shown in FIGS. 1A-1C and is designated generally by reference characters 100, 100B, and 1000, respectively. Other embodiments of a data transformation system in accordance with the disclosure, or aspects thereof, are provided in FIGS. 2A-8, as will be described.

Data transformation system 100 shown in FIG. 1A includes one or more client machines 102 operated by a user, one or more servers, including one or more web servers 104, one or more applications servers 106, an artificial intelligence (AI) server set 108, a log server 112, an output data server 114, and an application data server 116. The user can be an author that develops (creates and/or modifies) and/or executes process flows and/or programming blocks, or a non-developer user that executes process flows. Client machines 102 and the servers can communicate via a network 101, e.g., the Internet, and/or wired or wireless communication, such as an Ethernet, WiFi, etc.

Client machines 102 are provided with a development and execution (D&E) platform, that can be implemented as a desktop application (as shown in FIGS. 1B and 1C) or a web-based application (as shown in FIG. 1A). The D&E platform includes a graphical user interface (GUI) via which the user can select a process flow and/or a programming block from respective directories of process flows and programming blocks, develop process flows and/or programming blocks, and execute the process flows, all within a single integrated environment. In one or more embodiments, the user can further interact with a community of users, e.g., to exchange information about experiences, recommendations, feedback, etc. In one or more embodiments, when implemented as a web-based application as shown in FIG. 1A, the D&E platform can be provided to client machines 102 by web servers 104 that provide web services for users and data flow. Web servers 104 can be arranged, e.g., as a web server farm. The GUI can be provided to client machines 102 by web servers 104 upon initiation of a web session, and can be supported by application servers 106. The GUI can be provided, for example, as a web page. The application servers 106 can be appointed to execute demanding tasks requested via the GUI, e.g., compiling source code of a programming block, executing a process flow, etc. In one or more embodiments, application servers 106 execute individual application sessions for web sessions initiated by a user.

In one or more embodiments, when implemented as a desktop application as shown in FIGS. 1B and 1C, the D&E platform can be provided by a D&E application that is resident on the respective client machines 102. The GUI and demanding tasks can all be performed by the D&E application.

The term "D&E session" refers generically to a user's interaction with the GUI for development, execution, and/or collaboration purposes from initiation to termination of the GUI. The D&E session can be web-based or desktop-based, and can involve web and/or application sessions. The terms "D&E session," "application session," and "web session" can be used interchangeably without limiting usage of the term.

Data transformation systems 100, 100B, 100C in different embodiments can include client machines 102 together with any combination of web server 104, application servers 106, and AI server set 108. For example, in one or more embodiments, the D&E platform can be provided directly to client machines 102 by application servers 106, foregoing the need for web servers 104. In one or more embodiments, the D&E platform is implemented as a desktop application executed by client machines 102, e.g., using Windows Presentation Foundation (WPF) framework. In one or more embodiments, the disclosure can be implemented using a web application that can be accessed through a browser of the respective client machines 102. In one or more embodiments, application(s) for implementing the D&E platform on a client machine 102 are resident on the client machine, and the client machine 102 operates as a standalone system for providing the D&E platform.

In some embodiments AI/ML server set 108 is provided, but in other embodiments it is not. In some embodiments the D&E platform provides an integrated platform for development and execution, such as shown by integrated D&E engine 160 shown in FIG. 1B. In some embodiments the D&E platform provides only development or execution capabilities, or provides both development and execution capabilities, but not as an integrated platform. The features of transformation systems 100, 100B, and 1000 are shown as examples, and the disclosure encompasses different embodiments with a mix of the various features shown in FIGS. 1A, 1B, and 1C.

In one or more embodiments, AI/ML server set 108 can be included for learning about data transformations that have been performed; exploring different possible transformations; recognizing user behaviors that indicate issues with executing a process flow; making recommendations by inferences from previous data transformations performed and/or explored and/or from recognized user behaviors.

Data transformation system 100 includes several data servers, including log data server 112, output data server 114, and app data server 116, each having at least one repository for storing data and at least one processor for managing data storage and retrieval, etc., which together can include for example, a relational database, a relational database management server (RDBMS), such as a SQL server, and a file server (e.g., for storing compressed files). Each RDBMS stores (e.g., in relation to process flows and programming blocks) data such as for example session information identification (ID) (e.g., for a development session in which it was developed, a training session in which it was modified, an execution session in which it was executed), timestamps, and file path information. In this way, data stored in different repositories of different servers (e.g., log data server 112, output data server 114, and app data server 116) can be correlated by common information, such as session IDs and/or timestamps.

Log data server 112 includes at least one managing processor 107 and one or more associated repositories 109 storing general log data. Each of client machines 102 web servers 104, and application servers 106 can maintain logged data that is stored by log data server 112. The log data can be associated with individuals client machines 102 or individual application servers 106 and/or aggregated contextually (e.g., per office, geographic region, language, product, task, etc. The log data can include, for example, time stamped log information associated with development or execution of a programming block or process flow about user action data (open, close, edit, start execution, user behavior, request help, etc.), warning data, error and/or success data, user feedback data, content of any associated dialogs, management data, data about failed executions, data about debugging, and data about user input device (UID) interrupt signals, identification of the log and log entry, process flow name, versions of D&E platform and AI system set 108, etc.

The log data can be provided directly by client machines 102 and/or from a D&E session, e.g., implemented by any of application servers 106 or an application executing on a client machine 102. The user-related data can include user feedback about an application being executed and content of any dialogs associated with elements (such as dialogues configured to request a file from a user, offer help to the user, inform the user about successful operation, etc.) associated with the D&E session. Data stored by log data server 112 can be shared with output data server 114, e.g., stored with output data in its repository 113.

Output data server 114 includes at least one managing processor 111 and one or more associated repositories 113 storing output data. The output data is data that is output by a process flow or programming block upon execution. Webservers 104 can submit output data per end-user to output data server 114 for storage therein.

Application data servers 116 include at least one managing processor 115 and one or more associated repositories 117 storing app data, which includes, for example, input and temporary or intermediate execution information data, per web session or application session. AI/ML server set 108 can request from associated repositories, during any D&E session or while performing training on a continual basis: input data from application data server 116, output data from output data server 114, log data from log data server 112, and predefined dictionaries from dictionary server 610 (shown in FIG. 6A), individually or by group. Performance can be enhanced by using queues for data about current web sessions (e.g., that is related to a particular user), data from the predefined dictionaries and input or output data exchanged between client machines 102 and application servers 106 to ensure fast data transfers.

The D&E platform can be implemented by a code editor (CE) 122 for creating and editing programming blocks, a process flow editor (PFE) 124 for creating process flows from programming blocks and editing process flows, a compiler 126 for compiling programming block source code 126, and an execution engine 128 for executing process flows by executing programming blocks of the respective process flows to perform different kind of tasks.

Each process flow provides a complex solution (meaning a software program) for solving a specific data transformation problem (e.g., prepare a target dataset (for example a configuration file for System B) by converting data from an input dataset (e.g., a database of System A)). An individual process flow allows data conversion and/or transfer, in which data is converted and then transferred, e.g., from the input dataset to a target dataset. The process flow is formed of programming blocks.

Each programming block includes a programmed solution for an elementary task of the process flow (e.g., get data of a table from the database of System A). Programming block of a process flow are building blocks for a process flow, and can be reused in many different process flows (e.g., by changing a value of one or more parameters of the programming block, the programming block will get data of another table from the same database or a different database.) In this way, the programming block can be used in a different process flow. Programming block typically provides methods for converting, storing, or moving data, and can further provide methods for communicating with a user and/or include logic per design of the programming block's author. In general, a purpose of the programming block is to provide a single solution for a primitive data transformation problem (e.g., conversion of an XLSX document to a XLS document) and to be reusable with different process flows.

A programming block can be programmed in different languages, such as C#, visual basic (VB) and other programming language are possible. PFE 124 of the D&E platform can graphically represent each programming block in the GUI provided by the D&E platform, such as with a rectangular shape (see programming blocks 222 in FIG. 2A (without limitation to a specific shape)).

At least two files are needed for a programming block to function, namely a source code file and a currently compiled assembly created by compilation of the source code. The assembly can be stored, for example, in a shared library (e.g., a dynamic link library (DLL) file). The source code file can be modified and can then be recompiled to a new version of the assembly that is stored in a new version of the DLL file. The source code can be compiled on-demand. On-demand compilation can be initiated by a user-action, such as activation of an appropriate button or the equivalent in the GUI.

The programming block can optionally include additional files usable for compilation and/or execution, referred to as resources. The resources can include additional DLL files that provide functionality, one or more template files, etc.). For some programming blocks, the resources are necessary for the programming block to function.

Creation of a programming block or process flow can typically include associating searchable properties with the programming block or process flow, such as a title, a description of the programming block's or process flow's functionality, a category to which the programming block or process flow is assigned (e.g., programming block which compares two XLSX files can be in Microsoft™ Excel™ category or general comparison category), one or more user names that participated in development of the programming block or process flow, version, etc.

Figure 4:
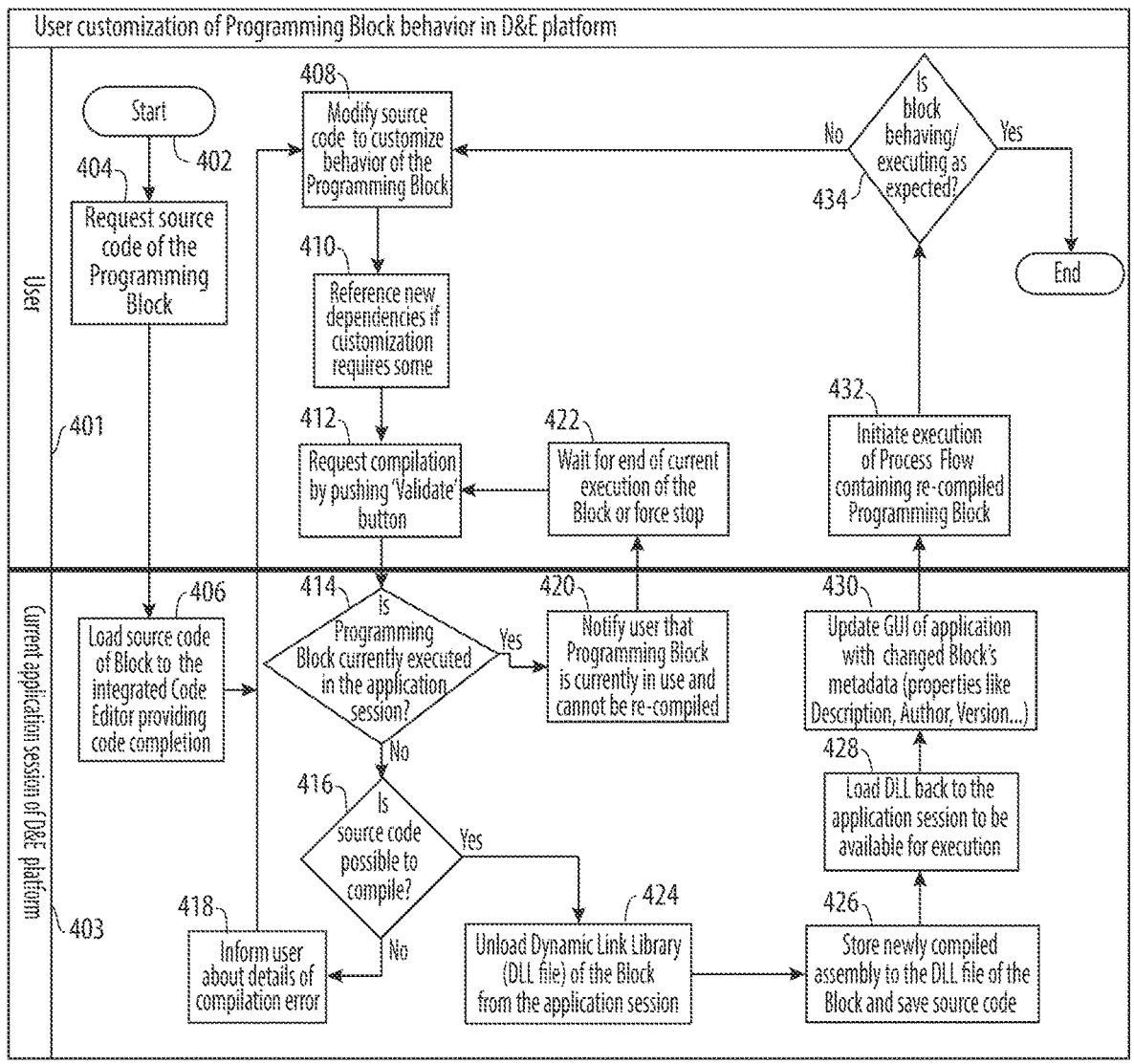
FIG. 4 shows a flow diagram of an example method to recompile a programming block when updating the programming block during a current application session of the D&E platform, in accordance with embodiments of the disclosure.

When a user decides to change source code of a programming block and recompile the programming block (such as by using the code editor 122), currently loaded assembly of the programming block is automatically unloaded from the current D&E session prior to re-compilation. The unloading process releases lockage of the DLL file (or equivalent) of the programming block. The edited source code is then re-compiled into the DLL file of the same programming block and assembly from the DLL file is immediately loaded back to the same current D&E session. The freshly edited and compiled assembly of the programming block is then available to be executed in the current process flow immediately after the compilation (as shown in FIG. 4).

The D&E platform thus provides a user with the means to develop and/or revise programming blocks that each include source code to define an algorithm, combine programming blocks into process flows to define algorithms, execute the programming blocks or process flow, stop execution, store output from each programming block that was executed, revise source code of any programming block included in the process flow, activate a tab in the GUI to compile the revised source code, resume execution (including of the revised and freshly compiled source code) from a selected location using the stored output as needed. Since the process flow is modular and split into multiple programming blocks, it is easier for a user to test an exact place at which source code was changed without changing the current state of execution and without repeating execution prior to the place being tested.

Programming blocks can contain parameters that represent one or more datasets that can be used within the programming block. Values of the parameters can be set while using the process flow editor 124 before a start of programming block execution. The value of the parameters can influence behavior of the programming block during execution. For example, while in the process flow editor 124, a user can right click on a programming block and be provided with a dropdown menu for editing parameters of the programming block. Each parameter can have a name, type, description and a value. The author of a programming block can define a parameter by specifying a parameter name, type, and description. A normalization process can be applied to the parameter values before storing them.

In an example, the author can design a programming block that opens all documents stored in a folder having a suffix ".pdf". An algorithm of the programming block searches for tables and figures within the opened .pdf documents and creates an output summary list of tables and figures. The author in this example modified the programming block by defining the following parameters:

| Parameter name | Type | Description |
| --- | --- | --- |
| documents_folder_path | string | Folder with PDF documents to be processed. |
| search_in_subfolders | boolean | Choose Yes if you want to process PDF documents located in the subfolder of documents_folder_path as well. |
| list_full_file_path | boolean | Choose No to use relative PDF document path to the documents_folder_path in the output list. |

A user later selects (by dragging from a directory and dropping in a work area) a compiled and released version of the programming block and places the selected programming block into a process flow located in the work area. The user sets values of the parameters using flow editor 124 as follows.

| Parameter name | Value | Description |
| --- | --- | --- |
| documents_folder_path | \myWorkspace\PDFs\Project1\ | Folder with PDF documents to be processed. |
| search_in_subfolders | No | Choose Yes if you want to process PDF documents located in the subfolder of documents_folder_path as well. |
| list_full_file_path | No | Choose No to use relative PDF document path to the documents_folder_path in the output list. |

The user executes the process flow and realizes that some .pdf documents (from the subfolder \myWorkspace\PDFs\Project1\manuals\) are not referenced in the summary output list of the programming block. To trouble shoot, the user changes the value of parameter search_in_subfolder as shown below:

| Parameter name | Value | Description |
| --- | --- | --- |
| search_in_subfolders | Yes | Choose Yes if you want to process PDF documents located in the subfolder of documents_folder_path as well. |

The user then executes the process flow again and is satisfied with the result, because the summary list of tables and figures now contains references to all expected .pdf documents.

A process flow is a collection of programming blocks with a defined order of execution to help a user solve a complex problem. As described above, each programming block is a program that provides a solution to an elementary task. A process flow can be understood to be a modular collection of the programming blocks, wherein each of the programming blocks could be considered to be a simple software program that could theoretically be compiled to a separate executable file in a conventional process of software development.

A process flow can include conditional branches or loops. Programming blocks can be executed sequentially by connecting them in order or they can be executed on demand manually in the process flow. A process flow can include one or more path. Each path can include a single programming block or a sequence of connected programming blocks. Each path is placed into the process flow separately from other paths. A sequence of connected programming blocks which is connected to a conditional decision point of a process flow, is called a branch of the process flow. Programming block parameters can be used in a process flow to achieve different results or conditions when executing a given process flow.

Figure 2A:
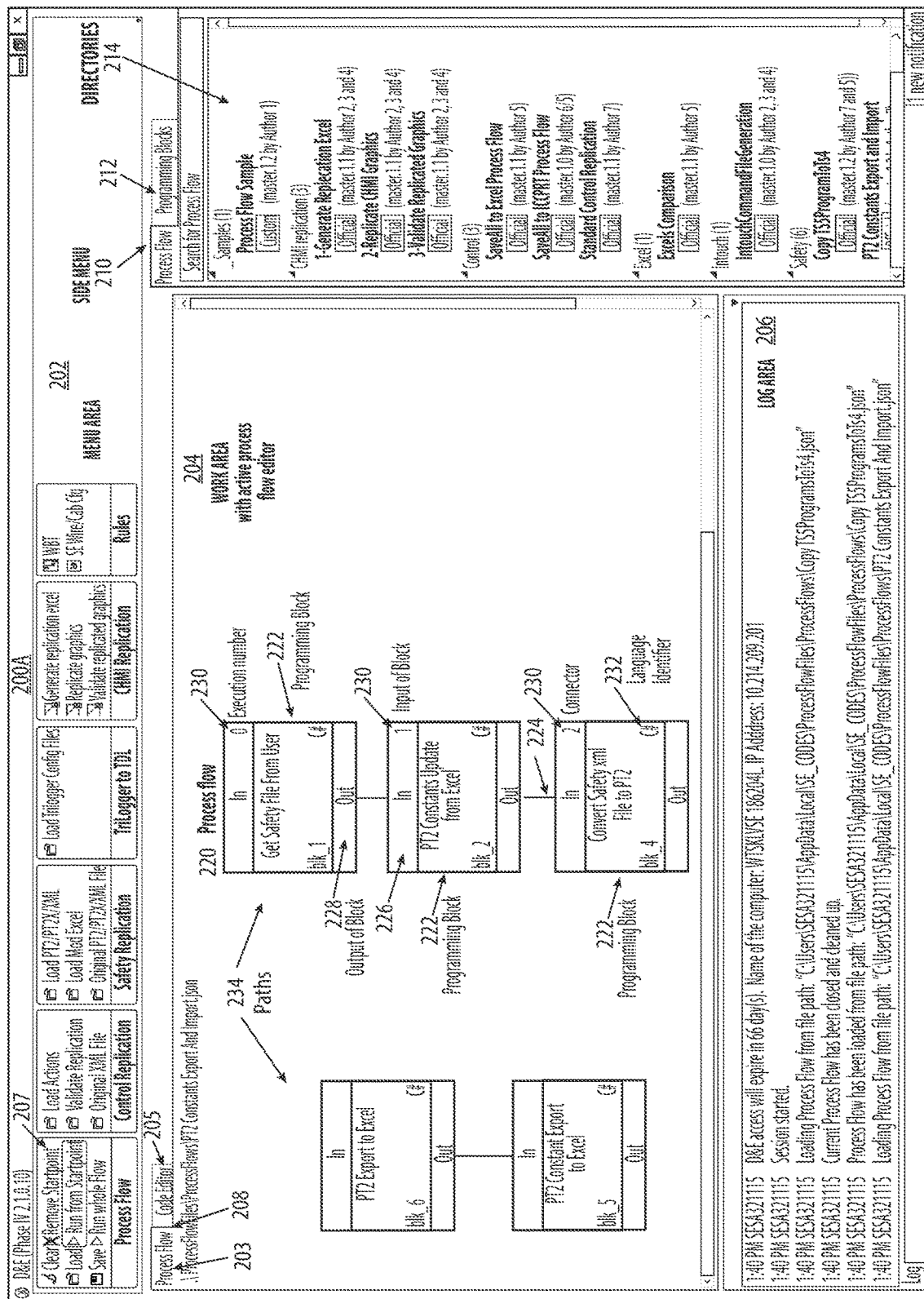
FIG. 2A is a screenshot of an example graphical user interface (GUI) of a development and execution (D&E) platform of the data transformation system with an active process flow editor, in accordance with embodiments of the disclosure.
Figure 2B:
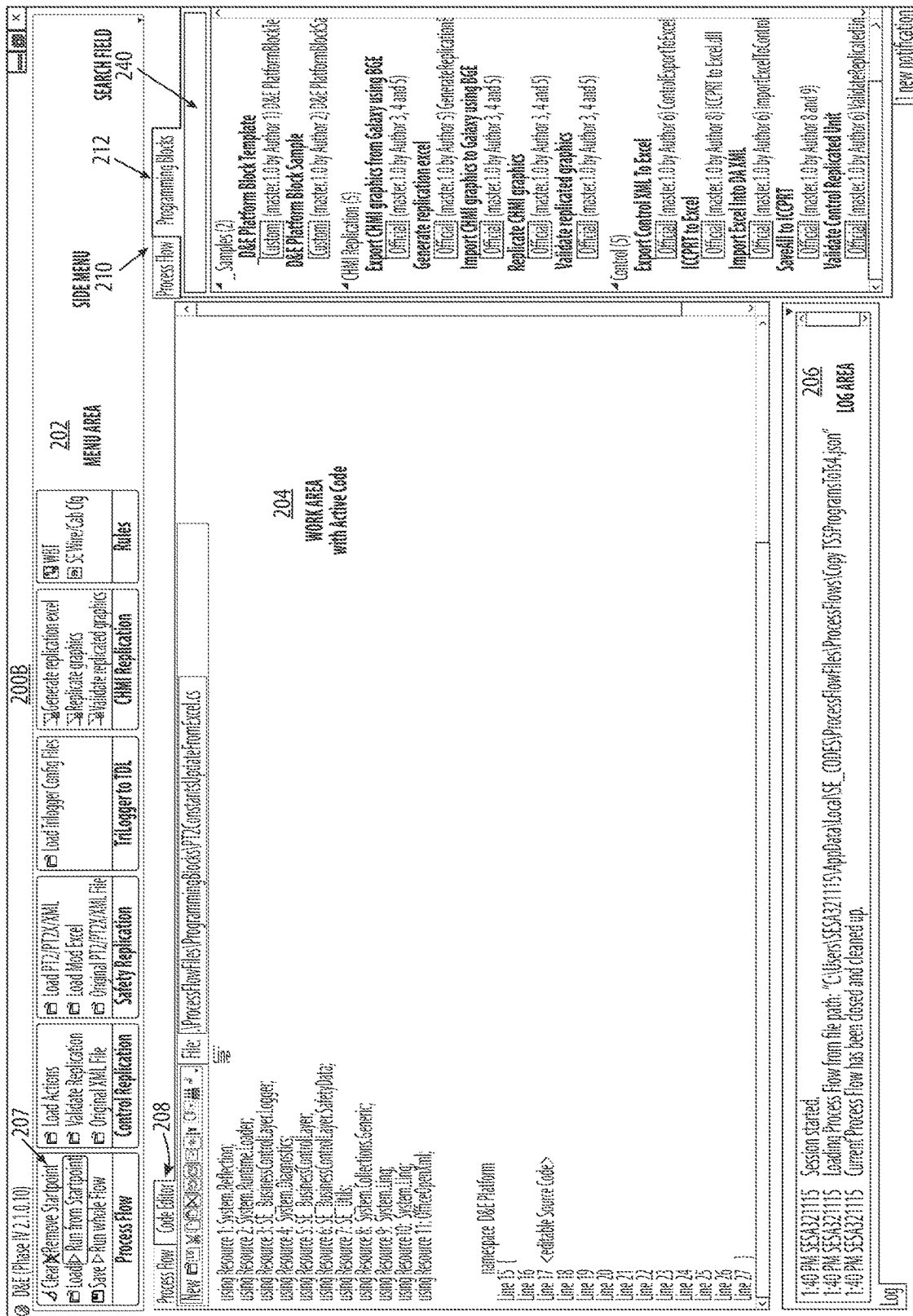
FIG. 2B is a screenshot of an example GUI of the D&E platform of the data transformation system with an active code editor, in accordance with embodiments of the disclosure.

With additional reference to FIGS. 2A and 2B, example screenshots 200A and 200B are shown respectively of a Graphical User Interface (GUI). The configuration of screenshots 200A and 200B is not meant to be limiting but is meant to illustrate functionality available to a user via the user interface. A menu area 202 provides graphical elements for user actions. For example, menu area 202 includes graphical elements, such as tabs or process flow control buttons. A button refers to a user activation element (UAE) that a user can activate, such as by using a user input device (e.g., mouse, keyboard, or touchscreen) to select and activate (such as by clicking on the UAE). For example, buttons can be provided to save a process flow, run (meaning execute) a process flow etc.). The term "user" can refer to an author developing process flows or programming blocks or a user executing a process flow or programming block.

Users can modify menu area 202 by moving frequently used graphical elements, e.g., by dragging and dropping process flow items or tools from a directory, such as respective tree views listing available process flows and available external tools. A work area 204 provides an area for the user to work with process flow and/or selected programming blocks. A log area 206 logs information about execution outcomes, errors and information about user actions during a session.

External tools are available in case there exist former or legacy separate software tools that are not yet redesigned to be implemented as programming blocks. This way, the D&E platform can integrate additional tools which may be of interest. Each of these external tools can be bundled based on its work environment, and can further be wrapped, for example, as a DLL or a wrapped executable file. An external tool can be executed as a separate process. Such executable files are not included in a process flow. Rather, the executable files are selectable from a directory, such as displayed in a ribbon or a hierarchical menu, such as a tree view. This allows the D&E platform to be a single source of software tools in addition to process flows.

A user can start a new D&E session or resume a previously started session stored by the user. When storing a current D&E session, the D&E session stored is defined by a process flow and its properties currently loaded in work area 204 (e.g., can be seen when a process flow editor tab 203 is selected), source code of one or more programming blocks loaded in work area 204, cached output data of user-selected programming blocks in the process flow that were already executed. (Storing cached output data of only selected programming blocks avoids wastage of storing space by allowing the user to select which output data really need to be stored). Output object of data output by a programming block during a D&E session can be serialized to JavaScript Object Notation (JSON) format. Serialization is a process of converting an object into a stream of bytes to store the object or transmit it to memory, a database, or a file.

A mode of the session is selected by UAEs, such as tabs 208, including process flow editor tab 203 and a code editor tab 205. Screenshot 200A shows operation of D&E platform 100 when using the process flow editor 124 (as shown in FIG. 1) selected using the process flow editor tab 203. When using the process flow editor 124, a user can select and add one or more programming blocks and or process flows from a directory of available process flows or programming blocks using side menu 210. The directory of available process flows can be stored in application data server 116 or together with a desktop application that implements the user interface (meaning in an embodiment where the D&E platform is implemented as desktop application using, for example, WPF framework).

Side menu 210 can be configured to display a directory 214 selected from available directories using side menu tabs 212 to show items, such as available process flows as shown in screenshot 200A (by selecting the process flow tab of side menu tabs 212) or programming blocks as shown in screenshot 200B (by selecting the programming block tab of side menu tabs 212). The menus of process flows and programming blocks can be configured hierarchically, e.g., as a tree with branches of categories and optionally one or more levels of sub-categories. Optionally, the branches can be collapsible and expandable. The process flow and programming block items can have indicators to indicate if it was defined by the user (referred to as a custom process flow or a custom programming block) and is private by default to the user (and can be shared with other users if granted permission) or is available publicly to other users (referred to as an official process flow or an official programming block).

Programming blocks can be moved via the GUI provided by process flow editor 124 into work area 204, e.g., by dragging and dropping a selected item from the side menu 210 using a pointing device. Once situated in work area 204, programming blocks are represented as graphical elements and can be manipulated.

A process flow can be loaded via the GUI provided by process flow editor 124 into work area 204, e.g., by double-clicking on the selected item from the side menu 210. All programming blocks included in the loaded process flow are represented as graphical elements in the GUI provided by process flow editor 124, upon which the graphical elements can be manipulated and connected, effecting manipulation and connection of the associated programming blocks. Loading of a process flow causes a previous state of the process flow editor 124 to be erased and execution of the process flow to be canceled. Accordingly, only one process flow can be loaded at a time.

Another example method of loading a process flow via the GUI provided by process flow editor 124 (into work area 204 without limitation to the specific methods described) includes dragging and dropping selected items from side menu 210. In this example, unlike double-clicking, when dropping the process flow, the author or user is prompted with a message, asking whether they select to merge or replace.

When the user selects "replace" (also referred to as LOAD), the previous process flow is removed, execution of the process flow is cancelled and the selected process flow is loaded.

When the user selects "merge," all programming blocks included in the dropped process flow are added to the current state of the process flow editor 124. The user can use the merge feature to combine different paths of programming blocks of two or more process flows being merged into one complex process flow. In this way, there is no need to place and configure programming blocks one by one.

Process flow editor 124 has two main functionalities. It can be used by any user to load and execute a process flow that is suitable for a problem needed to be solved. Process flow editor 124 can also be used to arrange programming blocks by connecting inputs and outputs of programming blocks, which specifies an order of their execution.

A programming block can be loaded via the GUI provided by code editor 122 into work area 204, e.g., by double-clicking on a selected item that corresponds to a programming block from the side menu 210. The GUI provided by code editor 122 can be used to change or review source code of the selected programming block and request re-compilation by compiler 126, if needed. The user can also create a new programming block using code editor 122.

The D&E platform can be provided as an integrated platform by integrated engine 160 shown in FIG. 1C, but which can be implemented as a web-based or desktop-based application in either of FIGS. 1A and 1B. This integrated platform provides appropriate GUIs for code editor 122 and process flow editor 124 in combination with compiler 126 and execution engine 128. This provides an integrated graphical development and execution environment via which the user can manipulate the graphical elements that correspond to process flows and programming blocks, specify direction of processing data between programming blocks or between merged process flows, modify how data is transformed by editing source code of programming block(s), and compile and execute programming blocks that are placed in process flows.

In addition to the functionality of process flow editor 124 described above to load and modify process flows and the functionality of code editor 122 to modify source code of programming blocks, the user can select a run command from menu area 202 by activating one of process flow buttons 207 to cause execution engine 128 to execute a selected process or a selected portion of the process flow. Accordingly, the GUIs providing menu area 202 and work area 204 of D&E platform provide an execution environment and development environment that are integrated together.

Some examples of data transformation tasks performed by programming blocks in a process flow when solving a data transformation problem include extracting all images from selected Word™ documents, reading scanned pictures and identifying text in the scanned pictures, and analyzing tables in a database to identify duplicates. These tasks are provided for illustration purposes only, and are not intended to limit the scope of the disclosure.

Work area 204 can also include additional UAEs, such as tabs with different functions. Some examples of UAEs and their functions include a simple form editor, a complex form editor, and a computer-aided design (CAD) type of interface.

The simple form editor allows an author of programming block to create basic forms and/or dialog forms, which provide means for interaction with a user during execution of a programming block. The simple form editor can include a list of variables on a simple form editor menu having a hierarchical (e.g., tree) view. The simple form editor menu can be located within, e.g., to the side of the current GUI displayed. The author can invoke the simple form editor, for example, from a context menu of the code editor (such as by right clicking in a designated row of the source code of the programming block) where a form should be invoked to the user during an execution process.

A template of the form can include, for example, a tabular grid that can be divided according to user definition. The simple form editor allows an author of a programming block to drag and drop listed variables from the hierarchical view or the simple form menu into the grid of currently edited or created form displayed in a work area of the simple form editor. This way the user can place GUI components into the form based on the type of variables in a defined scope. Scope (meaning class or method of source code of the programming block) is defined by a previously chosen row of source code, and scope is analyzed to search for all accessible variables (including parameters of the programming block). The user can drag from listed variables from the hierarchical view or the simple form menu and drop it into the grid of the form. A type of GUI component (textbox, checkbox, listview, label etc.) that can be used with the variable, is automatically advised based on the type of variable, and a new auto-sized instance of that component is created in the cell of the form grid. Binding of the GUI component and its related variable is done automatically, causing the variable's value to be shown during execution of the programming block on the form once the form is invoked via the logic at the designed row of the source code.

The complex form editor allows the author to create complex forms and dialogs forms for user interaction during execution using, for example, hypertext markup language (HMTL) format.

The programming blocks are written in a standardized form so that any programming blocks that have compatibility between output from one programming block to input of another programming block can be combined in a modular fashion. The programming language is understandable and readable by a user that is not a skilled programmer.

As shown in FIG. 2A, in work area 204, the graphical elements representing programming blocks 222 of a process flow 220 can be graphically connected by the user, such as by drawing connectors 224 between programming blocks 222 and/or providing connecting information, such as to indicate a start point, a direction of data flow, and/or an order of data flow. Connections between blocks can be specified using a pointing device and/or keyboard commands. Connecting information can be provided, for example and without limitation, by an assigned execution number 230. In the example shown, a programming block 222 having an execution number equal to zero will be the start point, meaning the first programming block 222 executed. The default programming block 222 that is the start point is the programming block 222 having its automatically assigned execution number 230 equal to zero, however other programming blocks 222 can be selected by a user as the start point. Execution number 230 equal to zero is automatically assigned to the programming block 222 selected by user as start point and execution numbers of following programming blocks 222 in a path 234 are recalculated in order. The value of the execution numbers 230 shows the order and direction of execution. Programming blocks 222 without execution numbers 230 will not be executed. The user can influence the execution number of programming blocks by either changing connections between blocks or by setting the start point to a selected programming block.

In one or more embodiments, only one of two separate unconnected paths 234 can be selected for execution, and parallel execution of the separate paths 234 is not allowed. In one or more embodiments, parallel execution can be allowed. Connected programming blocks 222 provide an output object (as specified by an output directive 228) from one programming block 222 to the input object (as specified by an input directive 226) of a next programming block 222 in accordance with the order in which they are connected. Similarly, connected process flows 220 (e.g., that were merged) provide an output object from one process flow 220 to the input object of another process flow 220 or programming block in accordance with the order in which they are connected. When two process flows are merged, the output directive 228 of the last programming block 222 of the first process flow is connected by a connector 224 to the input directive 226 of the first programming block 222 of the next process flow. An author of programming block 222 can declare a type of the output object of programming block 222 as any type pre-defined by D&E platform or an output object type can be declared as a custom type added by the author to the D&E platform or the output object type can be declared as a base type of the programming language used.

The D&E platform can interact with AI/ML server set 108 for using machine learning to further determine whether programming blocks 222 that are being connected together are compatible as connected for passing data between them. AI/ML server set 108 can suggest recommendations for insuring compatibility between programming blocks 222, such as by suggesting a different programming block to use, which is described in greater detail with respect to FIG. 7. For example, in FIG. 2C, a data type of output directive 228 of programming block 222A that specifies a type of data to be output must be compatible with a data type of input directive 226 of programming block 222B that specifies a type of data to be input. In FIG. 2D, when adding programming block 222D, a determination can be made by AI/ML server set 108 whether the data type of output directive 228 of programming block 222A is compatible with a data type of the input directive 226 of programming block 222D. Similarly, a determination can be made whether the data type of output directive 228 of programming block 222D is compatible with a data type of the input directive 226 of programming block 222B. AI/ML server set 108 can assist in detecting incompatibility.

However, when it is determined that two different programming blocks being concatenated into a process flow are not compatible and that compatibility cannot be fixed automatically, the D&E platform in conjunction with AI/ML server set 108 can warn the user about dysfunctional compatibility. The user can manually define data mapping between two different types to solve the compatibility issue. AI/ML server set 108 can provide additional support, based on user experiences with existing similar solutions that may be available, e.g., via the directories 214 for accessing stored code and associated logs, and propose possible paths to a solution for complex translations.

For example, a window can pop up, or otherwise be provided to the user to perform manual data mapping to solve a connection between first and second consecutive programming blocks. For example, the window can be provided when it is determined that a type of output being passed via the output directive 228 of the first programming block and a type of input expected at the second programming block via its input directive 226 are not the same.

For example, the window can show available output fields (e.g., field0-fieldX) for output directive 228 of the first programming block and available input fields (e.g., field0-fieldY) for input directive 226 of the second programming block. The user can select from the available output and input fields using the GUI, such as by dragging and dropping selected available fields into a selected area or checking/unchecking boxes for selected fields and correlating each selected output field to an input field.

Manual data mapping can provide additional features, such as allowing the user to edit the input and/or output values of fields, such as by combining (e.g., concatenating) two or more values of fields, adding, shifting, moving, or removing characters within a field value, applying logic or computations to characters of within a field value, etc.

The programming blocks 222 and process flows 220 listed in directory 214 of side menu 210 are stored in one or more local databases and/or local folders of client machine 102 (e.g., in log server 112) or of application servers 106 (e.g., in application data servers 116). A programming language used in source code of programming block 222 is indicated by language identifier 232. Different programming languages can be used for programming blocks 222. Programming language that can be used for creating a programming block 222 include, for example, and without limitation, C#, VB, and other programming languages can be possible. The author can select a programming language to be used for writing a new programming block 222.

Side menu 210 can include search field(s) 240 in which a user can input search terms or filter terms for searching or filtering results to find a solution using a programming block or process flow, such as by using a hierarchical view (e.g., a tree view) of stored programming blocks or process flows. Context sensitive searching and filtering can be performed based on terms such as title of a programming block or process flow, description of a programming block or process flow, category to which a programming block or process flow is assigned, user ratings for the programming block or process flow and/or sub-elements of process flows or programming blocks (e.g., by locating a leaf of a tree shown in the tree view).

The D&E platform provides a single environment for development, compilation, and execution of programming blocks and process flows. A newly compiled programming block is automatically added to user directory 214 (e.g., that can be accessible to user via a hierarchical view displayed in side menu 210). The user can select the programming block from the directory, add the programming block to a current process flow being developed in work area 204, and immediately execute the process flow by pushing a button in menu area 202.

Furthermore, the user can edit source code of any programming block in the process flow by transitioning to code editor 122 (while the process flow to which the programming block was added is still active in process flow editor 124). In addition, the newly edited programming block can be compiled without exiting the code editor 122 or process flow editor 124. While the process flow editor is still active, the newly compiled programming block can be executed within the process flow, such that it changes behavior of the process flow based on the edit to the source code right after successful compilation of programming block. The re-compiled programming block of the process flow can thus be executed without a need to otherwise modify the process flow.

Before or during execution the user can select an input file, e.g., from a local or remote database, to be used as input 226 to a programming block 222 that is part of the process flow 220 that is being executed. The input file can be selected without exiting the process flow editor 124.

The user can request a stop of execution of the process flow at any time. Process flow editor 124 caches data output by the programming blocks that have already been executed before the process flow was stopped. Data is cached per programming block for each programming block executed. When the user pushes a button, or the equivalent, in menu area 202 to resume execution, execution can resume by starting the programming block in the process flow where execution had been stopped. Alternatively, execution can be started at a different programming block marked as a start point by the user. Execution can be resumed at the selected start point regardless of whether any of the programming blocks downstream of the new start point were modified. The execution uses the recently compiled versions of programming blocks. If a programming block marked as the start point input is connected to a preceding programming block, and output of preceding programming block is not yet cached (probably due to the programming block being not yet having been properly executed), the user is warned, because execution from the start point will probably miss the data needed to be processed.

Figure 2C:
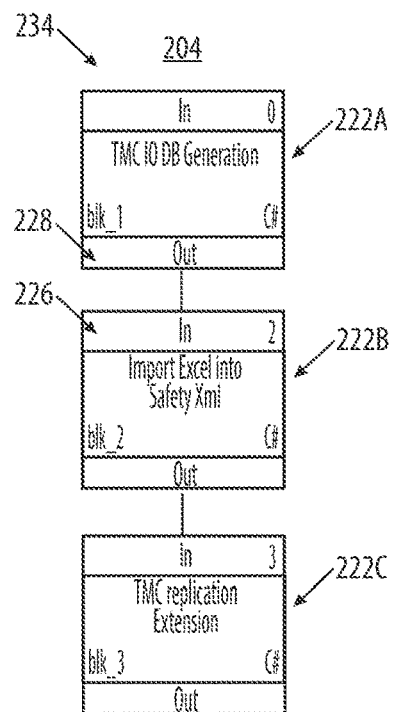
FIGS. 2C-2F are screen shots of the GUI of the D&E platform while using the process flow editor shown in FIG. 2A to manipulate programming blocks displayed in a work area of the GUI, in accordance with embodiments of the disclosure.
Figure 2D:
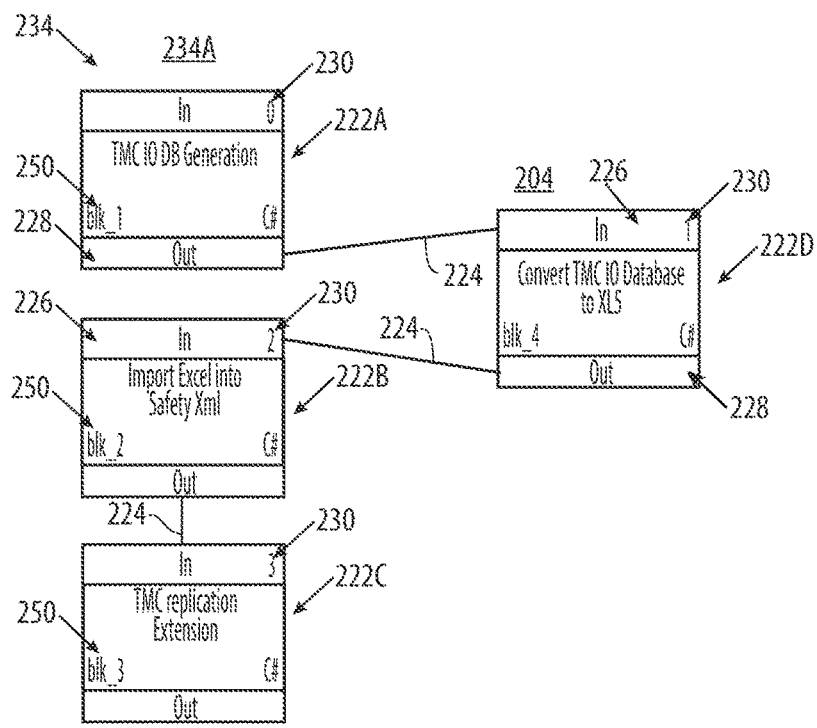

As illustrated in FIGS. 2C-2F, order of execution of the programming blocks can be influenced by user placement of the start point and by changing connectors 224. FIGS. 2C-2F show example manipulations to programming blocks 222 displayed in work area 204. In FIG. 2C, three programming blocks 222 having IDs 250 are displayed connected in a series to process flow path 234A in work area 204. A programming block 222A has an ID 250 equal to blk_1 and an execution number 230 equal to 0, a programming block 222B has an ID 250 equal to blk_2 and an execution number 230 equal to 1, and a programming block 222C has an ID 250 equal to blk_3 and an execution number 230 equal to 3, wherein the execution numbers 230 are assigned based on the connections, or vice versa. Output from programming block 222A is provided to input of programming block 222B. Output from programming block 222B is provided to input of programming block 222C.

FIG. 2D shows insertion of a programming block 222D having an ID 250 equal to blk_4 in which output from programming block 222A is provided to input of programming block 222D and output from programming block 222D is provided to input of programming block 222B. Programming block 222D can be inserted by selection from a directory (such as directory 214 shown in FIG. 2A), dragging and dropping the selection to work area 204, and adding connectors 224 to add programming block 222D to series 234A. The insertion of programming block 222D caused an update to the execution numbers 230 so that programming block 222A still has execution number 230 equal to 0, programming block 222D is assigned an execution number 230 equal to 1, programming block 222B is reassigned an execution number 230 equal to 2, and programming block 222C is reassigned an execution number 230 equal to 3. If process flow path of programming blocks 234A was executed as a process flow, the default start point would default to the programming block 222 having execution number 230 equal to 0, namely programming block 222A.

Figure 2E:
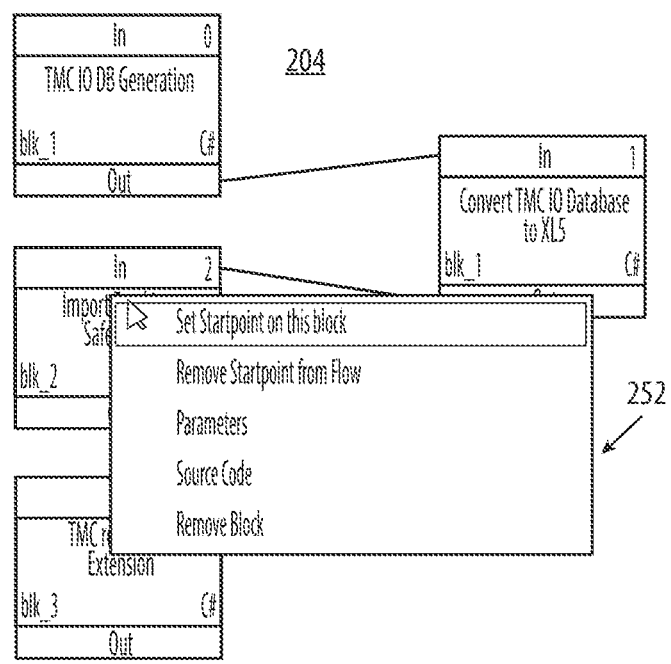
Figure 2F:
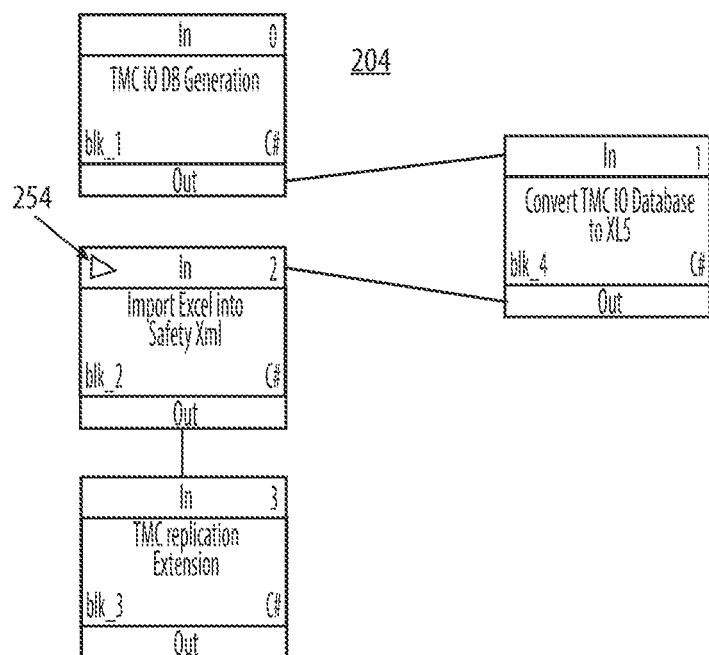

FIG. 2E shows a menu 252 that is displayed in response to a user action, such as right-clicking or hovering over programming block 222B by a user input device. The menu 252 shows some example options (without limitation) that can be selected for programming block 222B, including set start point, remove start point, adjust parameters, view and/or revise source code, and remove this programming block. A user has selected the first option in menu 252, namely set start point. The result of this selection is shown in FIG. 2F, in which programming block 222B is designated to have the start point 254 and is now reassigned execution number 230 equal to 0. Programming block 222C is reassigned execution number 230 equal to 1. Execution number 230 is removed from blocks 222A and 222D because they preceded the programming block 222B that now has the current start point 254.

Advantages can be gained by providing functionality to cache outputs of executed programming blocks in combination with functionality to set a start point at any programming block of a process flow. A programming block currently under development may be preceded by any count of programming blocks. The currently developed programming block may need output from the preceding programming block(s) as input. When executing and/or testing the currently developed programming block, the preceding programming blocks do not need to be executed each time an author revises and re-compiles the currently developed programming block to provide input needed. Rather, the author can set a start point at the currently developed programming block. Execution of the process flow will begin from the start point (which is the currently developed programming block). Execution engine 128 checks whether a cached output data object of the preceding programming block exists and uses it as an input to the currently developed programming block when executed. This feature of caching output data and flexible setting of the start point allows development and testing of a customized programming block while developing, testing, and executing the process flow to which the customized programming block belongs. Execution and testing can use selected input data and provide immediate results than can be used to determine whether further development and testing are needed, all without leaving the process flow editor 124.

In this embodiment, caching of the output data object of programming blocks is implemented using weak references to the output objects. Weak reference to the output object ensures that the compiled assembly (e.g., stored in DLL) of the currently developed programming block can safely be unloaded (and re-compiled) from the current application session without leaving process flow editor 124, even when the weak reference related to the compiled assembly still exists. At the same time, the weak reference ensures the output object is still reachable while it exists (meaning while the particular compiled assembly was not yet unloaded from the current application session).

The D&E platform, including process flow editor 124 and/or code editor 122, allows authors developing programming blocks in a process flow to use commands to control the process flow. One example command is an abort command. An author of source code of a programming block can include, for example, source code that validates a document provided as input to the programming block. The author can use the abort command to cause execution of a whole process flow to be aborted contingent upon a condition based on execution of the programming block, such as when validation of an input data set is unsuccessful. This can prevent, for example, useless execution of subsequent programming blocks with wrong data. Another example is a progress command. An author of a programming block can use the progress command to pass information about a percentage of progress of execution of the programming block (e.g., a percentage of data processed) to the GUI. During execution of the programming block, the GUI can display the status reported by the Progress command, such as by showing the percentage of progress in a progress bar provided in the GUI.

When a new process flow or a modified programming block is created or modified and stored in the dictionary of client machine 102 or application server 116, it can be stored in association with identification of the author, including author contact information. Usage data about usage by other users of the process flow or programming blocks authored by the author can be provided to the author automatically using the associated author contact information. The usage data can include data about timestamped issues encountered by users. This can include tracking additional modifications and tracking executions performed.

Statistical analysis can be applied to the log data and/or application data based using ML frameworks, for example Numpy™, Tensor Flow™, PyTorch™, Accord.Net™, SciSharp.Net™, and MS Cognitive ToolKit, without limitation to any particular ML frameworks. In one or more embodiments, machine learning techniques are used to report information about logged errors, etc. to authors as well as to users. Results of a statistical analysis of code in a particular process flow or programming block written by an author can be sent to the author, highlighting where a problem or break down occurred, how many active users (e.g., weekly, daily, per locality, etc.) have encountered the problem, and steps taken by these users to reach the problem. This avoids the need for users to reenact or demonstrate problems to authors. Each programming block can have an internally created flag that shows inheritance to determine where in the code the problem happened. Inheritance can be determined based upon logged start and stop timestamps, and logged errors with timestamps.

User feedback can be obtained in association with execution of a process flow or programming block. This feedback can be obtained by providing a survey for the user to complete, wherein the user's feedback via the survey is logged in association with the corresponding process flow or programming block. The feedback can be anonymized and aggregated and made available to the author, e.g., via a webpage, such as via a designated tab provided by the GUI.

When a request is submitted (e.g., by a user, such as an engineer) to develop a programming block or a whole process flow to find a solution for a simple or complex data transformation task, the requests can be made available to a community via issue tracking system 110 for a community of developers users and/or non-developer users, e.g., via a webpage, such as via a designated tab provided by the D&E platform. Users in the community can provide feedback by rating or signaling approval of usefulness of a request and/or need for its solution. The community feedback can assist users the D&E platform to develop a programming block or process flow to decide which request to answer and to estimate a date of completion.

Negative feedback detected and/or tracked by issue tracking system 110 or entered by the community of users can automatically be provided to the author. In this way, the author is aware of potential issues and can continue to develop the programming block for new uses and/or to correct defects in the programming block or process flow.

Tracked issues can be stored as log data or application data and can be tracked by issue tracking system 110. Issue tracking system 110 can consult logs 112 that are integrated with the D&E platform or other repositories of tracked issues. The issues can be associated with tracked user behavior during development or execution of a process flow, user-entered feedback, community feedback entered by members of the community of users, system generated errors or failures, etc.

Issue tracking system 110 can be provided locally on a client machine 102 or can be provided via web server 104 or application servers 106. Any of the embodiments shown in FIGS. 1A, 1B, and 1C can include issue tracking system 110. Some sample issues can include timestamped errors or warnings, failed executions, and/or indications of user frustration. Indications of user frustration can be determined from interrupt signals received from a UID 103 operated by the user, such as interrupt signals that indicate the UID 103 is being used in an erratic way, too slowly, too quickly, etc. The issues can include time spent on a development or execution task taking too much or too little time. In one or more embodiments, issue tracking can include logic operations, such as comparing a rate of receipt of timestamped interrupt signals to a threshold. In one or more embodiments, when user frustration is suspected based on results of issue tracking, the user can be prompted to offer help to the user. AI/ML server set can further process a current transformation set (wherein the transformation set includes an input dataset, process flow, and target dataset) and determine modifications to at least one of the input dataset, process flow, and target dataset) that would alleviate the user frustration.

In one or more embodiments, issue tracking can use machine learning techniques to learn normal patterns and deviations from normal patterns for a user, based on the user's previous behavior, or for the user or group of users in the context of an office, region, country, etc. In one or more embodiments, a machine learning component of AI/ML server set 108 can be trained to detect patterns of user behavior based on interrupt signals and to detect deviations or conformance with the patterns. The training can be for a community of leaders and can include learning patterns particular to an individual, individuals that work in the same office, live in the same geographic area, etc. In one or more embodiments, an author of a software program being executed can be notified about user frustration associated with the execution of the software program authored. In one or more embodiments, the time at which user frustration was detected is correlated to execution of a specific portion of a software program being executed.

Feedback from the community of users can be normalized and provided to authors associated with process flows and programming blocks. Machine learning can process the feedback (e.g., feedback about user behavior and/or end user feedback (e.g., rating user experience)) when recommending programming blocks or process flows or recommending revisions to programming blocks or process flows to a user or author.

With reference now to FIGS. 3-6B, shown are flow diagrams demonstrating implementation of the various exemplary embodiments. It is noted that the order of operations shown in FIGS. 3-6B is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Figure 3:
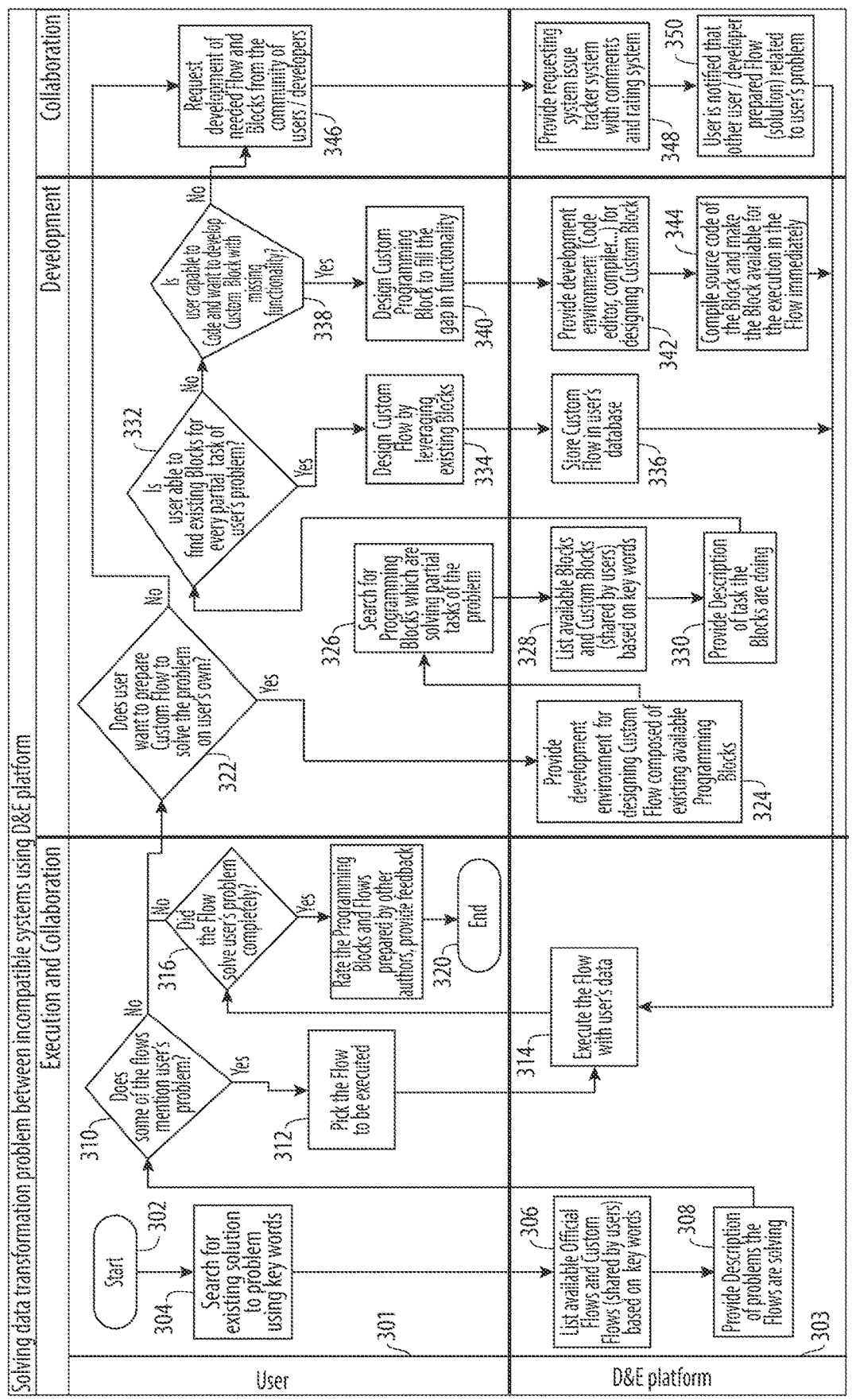
FIG. 3 shows a flow diagram of an example method to solve a simplified data transformation problem, in accordance with embodiments of the disclosure.
Figure 5:
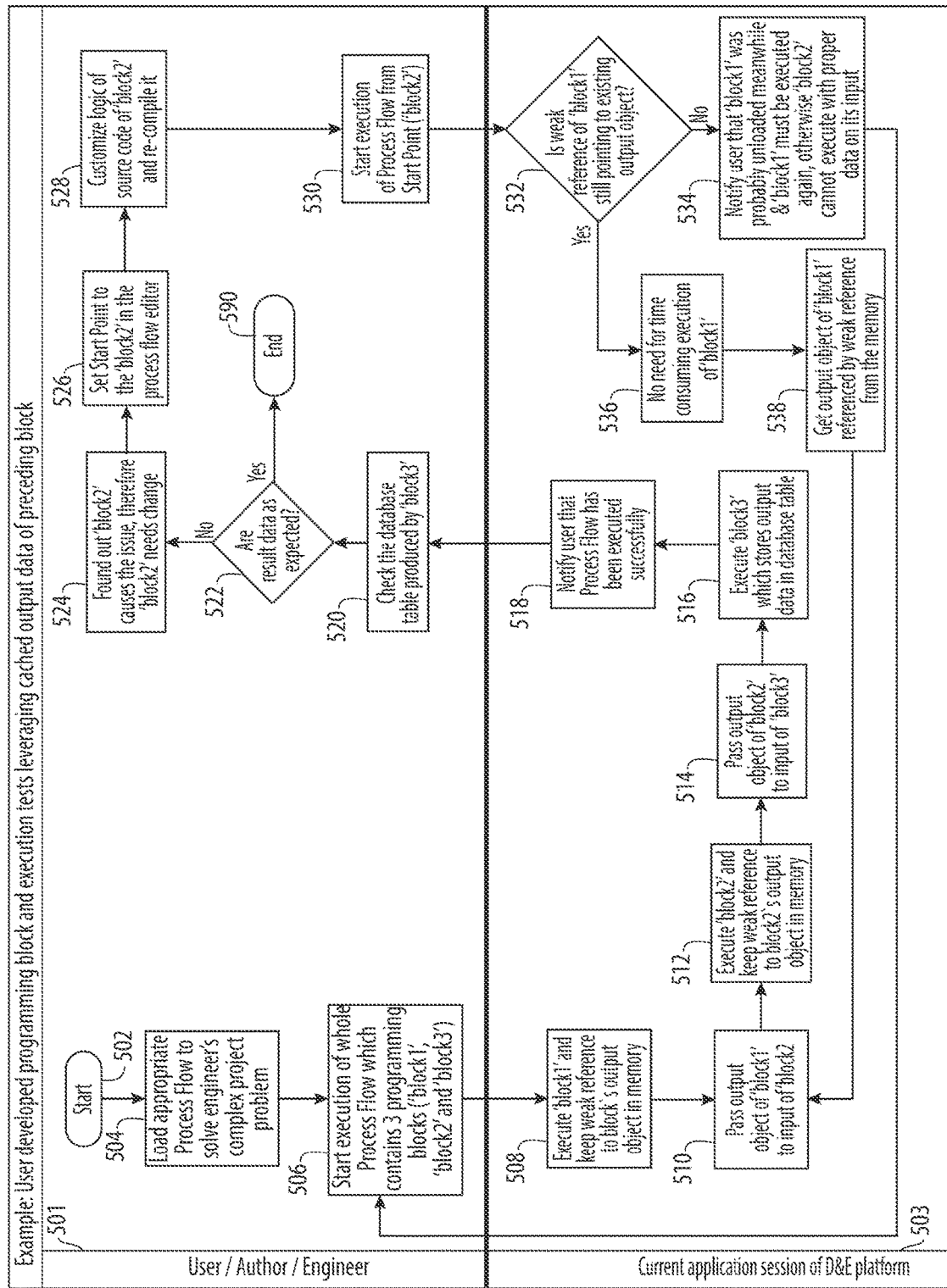
FIG. 5 shows a flow diagram of an example method to use cached output data of a preceding programming block during development of a current programming block and/or during execution of re-compiled versions of the current programming block, in accordance with embodiments of the disclosure.

FIGS. 3-5 illustrate example methods are performed by D&E integrated engine 160 of a data transformation system, such as data transformation system 1000 shown in FIG. 1C. It is understood that D&E integrated engine 160 can be provided as a desktop application or a web-based application in other data transformation systems, such as data transformation systems 100 and 100B of FIGS. 1A and 1B, respectively.

With reference to FIG. 3, an example method is shown in for solving a data transformation problem for transferring data between incompatible data processing systems. The entire method can be performed without exiting an application session of a D&E platform provided by the D&E integrated engine. Aspects of the method, such as performed by blocks 302-320 are associated with execution and collaboration tasks. Aspects of the method, such as performed by blocks 322-344 are associated with development tasks. Aspects of the method, such as performed by blocks 346-350 are associated with collaboration tasks. Blocks 302, 304, 310, 312, 316, 318, 320, 322, 326, 332, 326, 332, 334, 338, 340, and 346 show actions performed by a user, and blocks 306, 308, 314, 324, 328, 330, 336, 342, 344, 348, and 350 show actions performed by the D&E integrated engine.

The method starts at block 302. At block 304, a search is requested for an existing solution to a transformation problem using key words. The problem can be addressing a need to transform data output by a first data processing system to be available to be used by a second data processing system, wherein the first and second data processing systems are not compatible for transferring data between them. The first and second data processing systems can be different physical systems, each having one or more processing devices, or can share the same physical system, but use different applications executed by the one or more processing devices. The solution being sought is a process flow that includes one or more programming blocks that can operate on the data after it is output by the first data processing system before providing it to the second data processing system. A solution can also be one of the programming blocks that performs a particular task within the process flow.

The search accesses a dictionary of available process flows, such as one or more of dictionaries 610A-610N. The search can be in a specific dictionary based on a particular context (searching across solutions that pertain to any user, the user in particular, users of a particular office, users of a particular region, users of a particular country, solutions for a particular industry, solutions for a particular client, etc.).

At block 306, a directory is displayed that has been filtered to include candidate process flows selected from the dictionary based on the key word search. The directory can be shown, for example, in sidebar 210 of a GUI displayed by the D&E integrated engine 160. The dictionary includes entries that have been input by users and/or by an AI and/or ML server set, such as AI/ML server set 108 shown in FIG. 1. The dictionary can be accessed by a community of users that use the D&E platform. The directory can include official flows and custom flows and can be filtered, such as based on key words. The community of users can include users that execute process flows and/or programming blocks and authors that develop process flows and/or programming blocks.

An official flow is a process flow stored in a dictionary that has been vetted and met approval criteria, such as by being approved by the community of users and/or by the AI/ML server set. Official flows can be accessible to any user of the community of users to use. A custom flow, on the other hand, is a process flow that is not available to the community of users but is available to the user that is performing the search. The limited availability of the custom flow may be due to the custom flow being relatively newly developed, perhaps by the user, and not yet approved for accessibility to the community of users, or due to the custom flow being flagged as proprietary or confidential and only accessible to a designated user or group of users.

At block 308, metadata associated with the entries for the respective process flows selected to be included in the directory is accessed and displayed to the user. The metadata for each entry can include a description of a problem being solved by the entry's process flow.

Block 310 is a decision block, as indicated by the hashing. At decision block 310, the user decides whether the description metadata associated with the selected entries included in the directory mention information that is relevant to solving the transformation problem that the user seeks to solve.

If the decision at block 310 is that NO, meaning that none of the process flows display solve the problem, then the method continues at block 322.

If the decision at block 310 is that YES, meaning that a particular process flow does solve the problem, the method continues at block 312. At block 312, the user selects that process flow to be executed, such as by dragging it from the directory to a work area of the GUI, such as work area 202, and selecting a tab that commands execution of the process flow.

At block 314, the process flow is executed using input data specified by the user. The user can specify the input data using a dialogue box activated when the process flow is being executing or by specifying the input data before execution begins. The input data can be manually uploaded or entered or an address of a file including the user data can be provided for the process flow to access during execution.

At decision block 316, the user decides whether the process flow solved the transformation problem that the user seeks to solve. The user can try more than one process flow at blocks 312, 314, and 316 to determine if that process flow solves the problem when executed.

If the decision at block 316 is that NO, meaning that the process flow does not solve the transformation problem, then the method continues at block 322.

If the decision at block 316 is that YES, meaning that the process flow does solve the transformation problem, the method continues at block 318. At block 318, the user uses and rates the process flow and its programming blocks. These process flows and programming blocks may have been developed by other authors. The ratings are provided as feedback that can be used to inform authors if issues that arose and to help other users and/or the AI/ML server set 108 to select process flows or programming blocks to use. In fact, at block 310, the user can use feedback from other users of the community of users to decide of any of the process flows displayed fit criteria needed to solve the transformation problem. Next, the method ends at block 320.

At decision block 322, the user can decide whether or not to customize the selected process flow to solve the transformation problem.

If the decision at block 322 is that NO, meaning that the user does not want to customize the process flow, then the method continues at block 346.

If the decision at block 322 is that YES, meaning that the user does want to customize the process flow, then the method continues at block 324. At block 324, a development environment is provided by the D&E integrated engine for designing a customized process flow composed of available programming blocks that already exist in the dictionary.

At block 326, the user searches for programming blocks that are appropriate for contributing to solving the transformation problem, each programming block performing a partial task for solving a portion of the problem. The search can use search criteria, such as key words. At block 328 the directory displayed is updated to show candidate programming blocks selected from the dictionary based on the search criteria. The directory can include official programming blocks and custom programming blocks and can be filtered based on the search criteria.

At block 330, metadata associated with the entries for the respective programming blocks selected to be included in the directory is accessed and displayed to the user. The metadata for each entry can include a description of the partial task being solved by the entry's programming block. At decision block 332, a decision is made whether the user is able to find an existing programming block for each of the partial tasks needed to solve the transformation problem.

If the decision at block 332 is that NO, meaning that the user is not able to find an existing programming block for each of the partial tasks because the functionality of at least one of the partial tasks is missing cannot be provided by the existing programming blocks, then the method continues at block 338.

If the decision at block 332 is that YES, meaning that the user is able to find an existing programming block for each of the partial tasks, then the method continues at block 334.

At block 334, the user designs the custom process flow by leveraging existing programming blocks selected from the directory, including arranging the programming blocks in an order in which they should be executed by connecting the programming blocks consecutively in a path.

At block 336, the customized process flow is stored in user's database, but it has not been added to one of the dictionaries that will be available to the community of users. The method continues at block 314. Eventually the custom process flow can be stored in the dictionary as an official flow once it has met approval criteria.

At decision block 338, a decision is made whether the user is capable of coding programming blocks and would like to develop a custom block that has the functionality of the missing partial task.

If the decision at block 338 is that NO, meaning that the user is not capable of coding a programming block, then the method continues at block 346.

If the decision at block 338 is that YES, meaning that the user is capable of coding a programming block, then the method continues at block 340. At block 340, the user designs a custom programming block to perform the missing partial task. At block 342, a development environment is provided by the D&E integrated engine for developing the customized programming block, such as by providing, for example, a code editor and a compiler.

At block 344, source code of the custom block is compiled and the custom block is made to be available for execution in the process flow on demand at any time, including immediately. The method continues at block 314. Eventually the custom programming block and/or a custom flow that includes the custom programming block can be stored in the dictionary as an official flow once it has met approval criteria.

At block 346, the user requests from the community of users development of a process flow for solving the transformation problem and/or a programming block for performing the missing partial task. At block 348, a collaborative system is provided for the user's request, any problems encountered by the user, and any comments and ratings submitted by the user to be logged and shared with the community of users. At block 350, the user is notified when another user shares a solution to the user's problem, such as a process flow or programming block.

With reference to FIG. 4, an example method is shown for customizing behavior of a programming block using the D&E platform. The entire method can be performed without exiting a session of a D&E platform provided by the D&E integrated engine. Blocks 402, 404, 408, 410, 412, 422, 432, and 434 show actions performed by a user, and blocks 406, 414, 416, 418, 420, 424, 426, 428, and 430 show actions performed by the D&E integrated engine.

The method starts at block 402. At block 404, a user requests access to source code of a programming block that the user wants to customize. At block 406, the requested source code is loaded. The source code is displayed in the work area of the D&E integrated engine and a code editor is provided so that the user can edit the source code. At block 408, the user modifies the source code to customize behavior of the programming block. At block 410, the user adds references to new dependencies as required for the customization. At block 412, the user requests compilation of the programming block, such as by activating a button provided by the GUI.

At decision block 414, a determination is made whether the edited programming block is currently executed in the current application session of the D&E platform.

If the decision at block 414 is that NO, meaning that the edited programming block is not currently executed in the current application session, then the method continues at block 416.

If the decision at block 414 is that YES, meaning that the edited programming block is currently executed in the current application session, then the method continues at block 420. At block 420, the user is notified that the programming block is currently in use and cannot be re-compiled at this time. At block 422, the user waits for an end of the current execution of the programming block or forces the execution to stop. Blocks 412, 414, 420, and 422 can be executed in a loop until the decision at block 414 is NO.

At block 416, a determination is made whether it is possible to compile the source code. If the decision at block 416 is that NO, it is not possible to compile the source code, then the method continues at block 418.

If the decision at block 416 is that YES, it is possible to compile the source code, then the method continues at block 424.

At block 424 the DLL file of the programming block is unloaded from the application session. At block 426, a newly compiled assembly is stored to the DLL file of the programming block and the source code is saved. At block 428, the DLL file is loaded back to the application session and is available for execution. At block 430, updated metadata stored in association with the programming block is displayed by the GUI. The metadata can describe properties such as description, author, version, etc. At block 432, the user initiates execution of the process flow that includes the re-compiled programming block. At decision block 434, the user indicates whether the programming block is behaving and/or executing as expected.

If the decision at block 434 is that NO, meaning that the programming block is not behaving and/or executing as expected, then the method continues at block 408, providing the user with another opportunity to modify the source code. If the decision at block 434 is that YES, meaning that the programming block is behaving and/or executing as expected, then the method ends.

At block 418, the user is informed about details of compilation errors, and the method continues at block 408.

With reference to FIG. 5, an example method is shown in which a developed programming block is tested by executing the associated process flow and leveraging cached output data of a preceding programming block. The entire method can be performed without exiting a session of a D&E platform provided by the D&E integrated engine. Blocks 504, 506, 520, 522, 524, 526, 528, and 530 show actions performed by a user who can be, for example, a developer or an engineer. Blocks 508, 510, 512, 514, 516, 518, 532, 534, 536, and 538 show actions performed by the D&E integrated engine during a single application session.

The method starts at block 502. At block 504, a process flow is loaded that is appropriate to solve engineer's complex project problem. The process flow can be loaded by the user selecting it from the directory and dragging and dropping it in the work area of the D&E platform's GUI. At block 506, the user starts execution of the whole process flow. In this example, the process flow includes three programming blocks ('block1', 'block2' and 'block3').

At block 508, 'block1' is executed and a weak reference to block1's output object in memory is kept. At block 510, the output object of 'block1' is passed as input to 'block2'. At block 512, 'block2' is executed and a weak reference to block2's output object in memory is kept. At block 514, the output object of 'block2' is passed as input to 'block3'. At block 516, 'block3' is executed and in this example output data of 'block3' and the process flow is stored in a database table. At block 518, the user is notified that the process flow has been executed successfully.

At block 520, the user checks the database table produced by 'block3'. At decision block 522 the user decides whether the output data stored in the database table is as expected.

If the decision at block 522 is that YES, meaning that the output data is as expected, then the method ends. If the decision at block 522 is that NO, meaning that there is an issue and the output data is not as expected, then the method continues at block 524.

At block 524, the user performs analysis and determines that 'block2' caused the issue, and that 'block2' therefore needs to be revised. At block 564 the user uses the process flow editor to set a start point at 'block2'. At block 528, the user customizes (or re-customizes) the source code of 'block2' and re-compiles 'block2'. At block 530, the user starts execution of the process flow from the start point at 'block2'. At decision block 532, it is determined whether a weak reference of 'block1' still points to an existing output object.

If the decision at block 532 is that NO, meaning that a weak reference of 'block1' does not still point to an existing output object, then the method continues at block 534.

If the decision at block 532 is that YES, meaning that a weak reference of 'block1' still points to an existing output object, then the method continues at block 536. At block 536, it is determined that there is no need for time consuming execution of 'block1'. At block 538, the output object of 'block1' is referenced by weak reference from the memory. The method continues at block 510 for continuing execution of 'block2' using by passing the output object of 'block2' to the input of 'block1'.

At block 534 the user is notified that 'block1' was probably unloaded since keeping its weak reference, and that the output object of 'block1' therefore cannot be used. Inform the user that 'block1' needs to be executed again in order for 'block2' to receive proper data for its input.

Figure 6A:
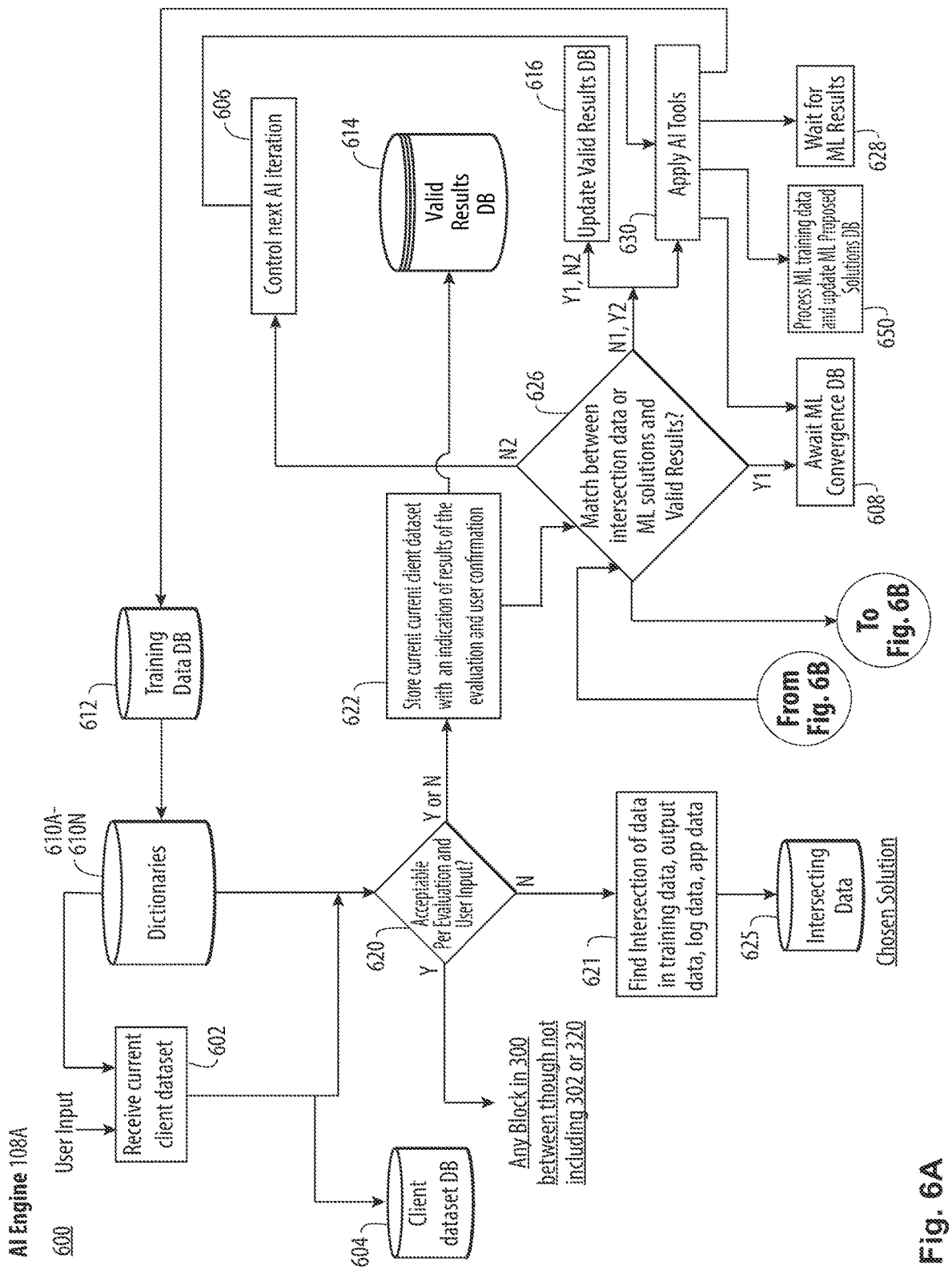
FIG. 6A shows a flow diagram of an example overall flow of operation of an AI server set shown in FIG. 1A or 1B configured for interaction with a user during development or execution of a process flow, in accordance with embodiments of the disclosure.
Figure 6B:
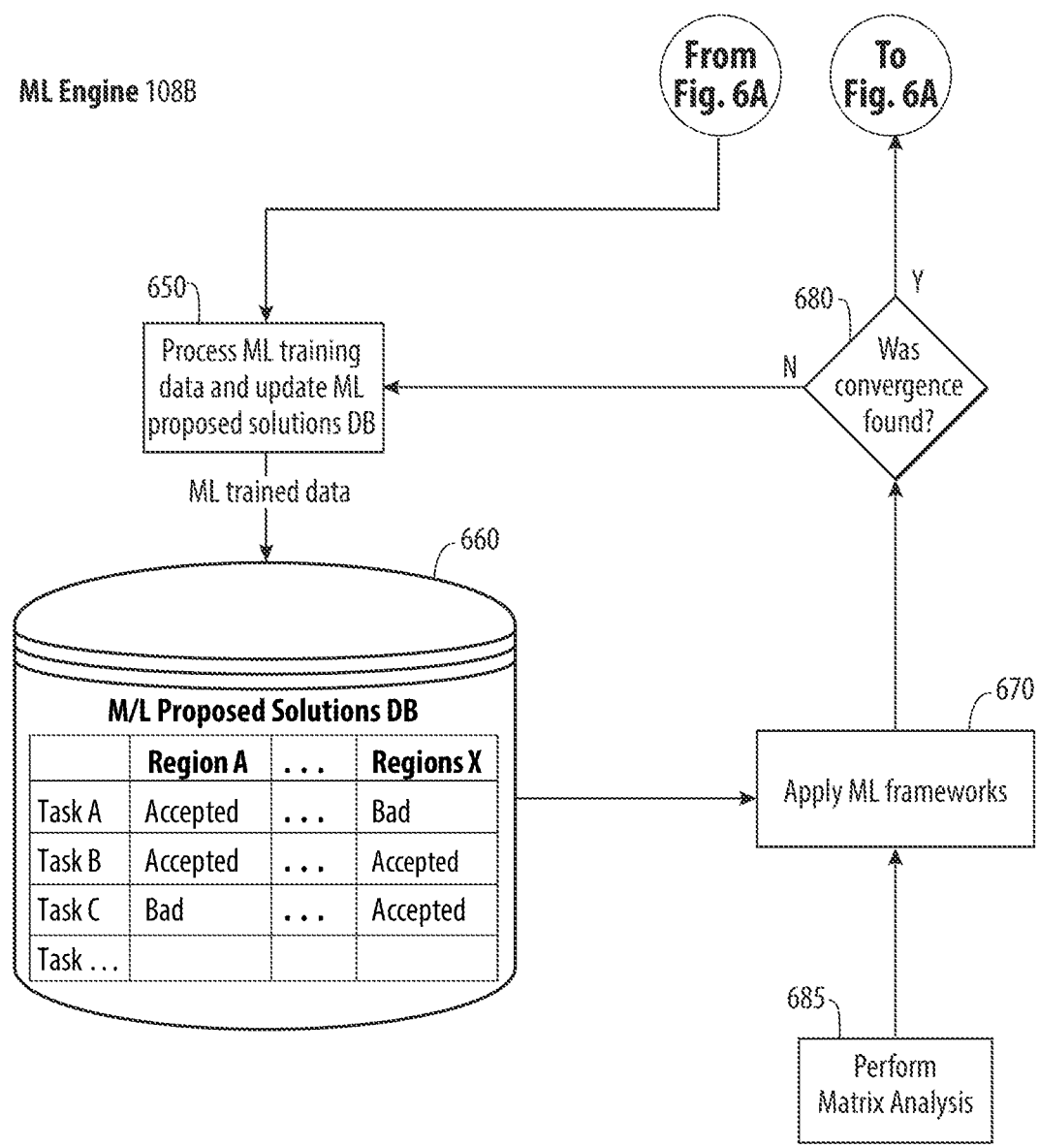
FIG. 6B shows a flow diagram of an example overall flow of operation of the ML server set shown in FIG. 1A or 1B configured for autonomous development of process flows independent of interaction with a user, in accordance with embodiments of the disclosure.

With general reference to FIGS. 6A and 6B, an example method performed by AI set 108A and ML set 108B is shown. AI set 108A and ML set 108B each includes one repository for storing data and at least one processor for managing data storage and retrieval, etc., which together can include for example, an RDBMS, such as a SQL server, and a server (e.g., to provide an exchange interface (e.g., web or windows services or tasks) to implement an exchange of data between applications and data storage systems within AI/ML server set 108) and to perform processing of data).

Figure 8:
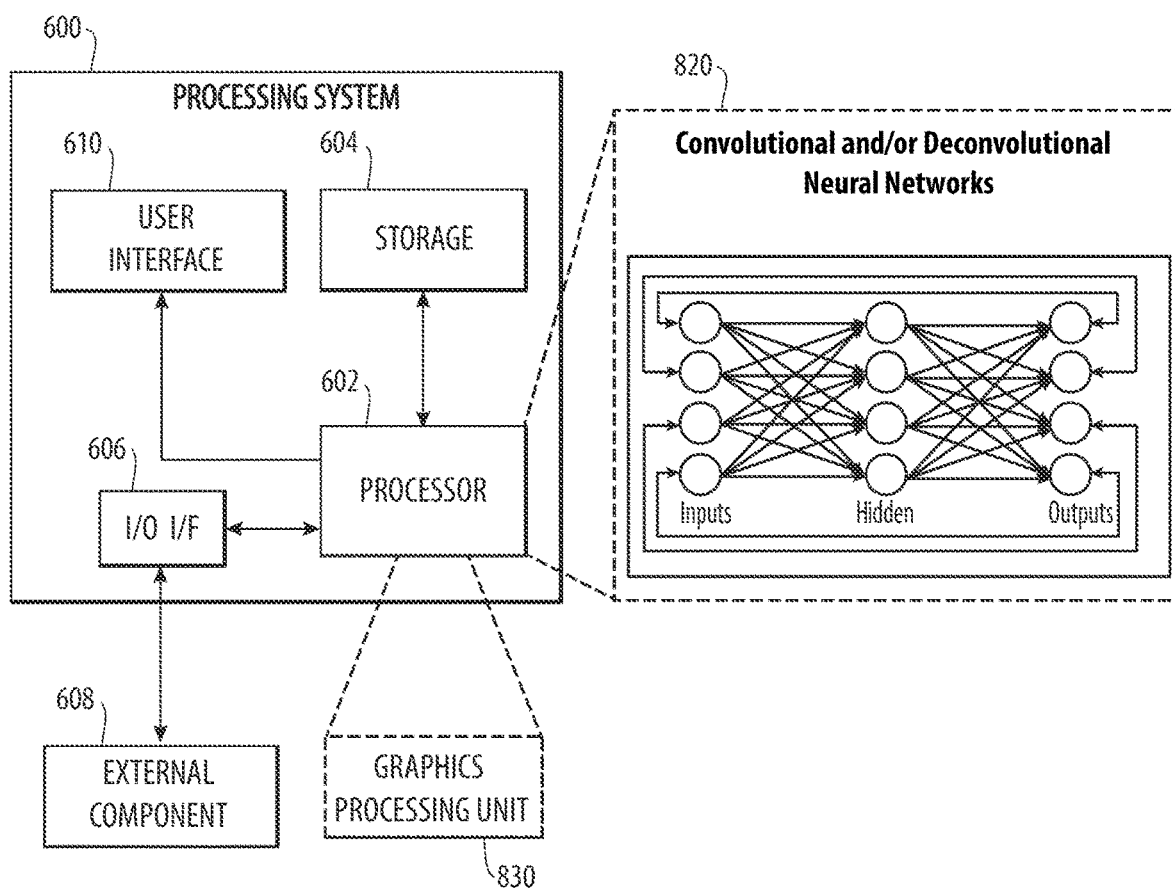
FIG. 8 is a block diagram of an exemplary computer system that implements components of the data transformation system shown in FIG. 1A, 1B, or 1C, in accordance with embodiments of the disclosure.

The servers for AI set 108A and ML set 108B are implemented on one or more computers, such as illustrated by computing system 800 shown in FIG. 8. Processors 802 of each of AI set 108A and ML set 108B has the capability of heavy duty processing used with machine learning, such as a graphics processing unit (GPU) 830. Additionally, AI set 108A includes at least one neural network 820, which can include one or more convolutional and/or deconvolutional neural networks having inputs, hidden layer(s) and outputs.

AI set 108A applies unsupervised reinforced training based on user feedback and client datasets (input dataset and target dataset) provided by a user of the community of users. AI set 108A utilizes client datasets provided by the user to create unsupervised learning and to create trained methods based on the unsupervised learning. ML Set 108B utilizes input from AI set 108A as supervised guidance and iterates over any or all available machine learning methods applicable to the input data set provided by the user. Different users of the community of users can submit client datasets to AI/ML server set 108.

The DB management systems for AI set 108A and ML set 108B are implemented on one or more computers, such as illustrated by computing system 800 shown in FIG. 8 and storage devices, which can be implemented as a portion of storage 804 or as an external device 808 as shown in FIG. 8. The DB management system of AI set 108A can store and manage valid results DB 614 and the DB management system of ML set 108B can store and manage a ML proposed solutions DB 660.

In one or more embodiments, each of AI set 108A and ML set 108B can use computers and storage devices that are dedicated to the corresponding server set of AI set 108A and ML set 108B. In one or more embodiments, AI set 108A and ML set 108B can share computers and storage devices, or portions thereof. AI set 108A and ML set 108B can each use tasks or services to access data from and exchange data between different storage or processing components of server set 108. Examples of tasks and services include Windows™ tasks, web services, Windows Services™, and server tasks.

The blocks shown in FIG. 6A are performed by an AI server set, such as AI set 108A shown in FIG. 1. The blocks shown in FIG. 6B are performed by an ML server set, such as ML set 108B shown in FIG. 1. At block 602, a D&E interface of the AI server set interfaces with D&E platform to receive client datasets. During a first iteration of block 602, the client datasets can be received by a user dragging and dropping a selected file or importing the file using the GUI of the D&E platform and stored in client dataset DB 604. During subsequent iterations of block 602, client sets that are modified by training data from training data DB 612 are received at block 602 and stored in client dataset DB 604.

The description of FIGS. 6A and 6B refers to a client dataset having a process flow and analysis applied to the process flow. Alternatively, the client datasets can include a programming block, and the analysis can be applied to the programming block.

The client datasets are transformation sets that include an input set from which includes one or more files from which input data is received and a target dataset which includes one or more files to which output data is delivered. The client dataset represents a transformation problem in which the input data is transformed into the output data. The output data included in the client dataset is desired output that is used to train the AI/ML server set 108 to select a process flow from dictionaries 610A-610N, referred to collectively as dictionaries 610, and modify the process flows as needed. Since dictionaries 610 are contextual, e.g., based on region, country, office, or user, the process flow can be selected based on context. The objective is to select and modify (if modifications are determined to be needed) a process flow that can receive the input data, process the input data, and output the desired output data.

The client dataset can also specify a context for which a solution is requested, such as per user, or a specific office, region, or country. The analysis performed by AI set 608A and ML set 608B can be limited to the specified context. Alternatively, such as if no context is requested, the analysis can be found for different contexts.

In an overall view of FIGS. 6A and 6B, in a first iteration, an initial transformation set is received and in at least one respective subsequent iteration a trained transformation set is received. Each of the initial and trained transformation sets includes components that include an input dataset, a target dataset, and a process flow for transforming the input dataset into the target dataset, wherein the trained transformation set uses training data that was generated using AI tools that modifies at least one of the components of the of a transformation set from a previous iteration. For each iteration, the components of the trained transformation set are compared to corresponding components of trained transformation sets of previous iterations and to intersecting data using the corresponding components of history data stored from execution or development of process flows over time. A trained transformation set is selected for solving the industrial data transformation problem if a suitable match is found based on the comparison.

In one or more embodiments, for each iteration, ML tools are applied to the trained transformation set to propose ML solutions that model transformation sets and convergence for the ML solutions is sought.

In one or more embodiments, the converged ML solutions are validated. If the suitable match is not found, the validation is not successful, or the convergence fails, the AI tools are applied to generate training data for a next iteration.

In one or more embodiments, for each iteration, user feedback is received, when available. The user feedback indicates whether the initial or trained transformation set corresponding to the iteration is acceptable to a user, and the user feedback is stored in association with the initial or trained transformation set and used for solving subsequent industrial data transformation problems.

In one or more embodiments, the history data includes one or more of output data from execution of process flows by a community of users over time, logged data about experiences of the community of users developing or executing process flows over time, and application data about intermediate results when developing or executing process flows over time.

During the first iteration of block 602, the client dataset can include an initial guess that includes a process flow selected by the user via the D&E platform. If no process flow is provided with the client dataset, the AI/ML server set 108 can generate an initial guess of a process flow for a next iteration, as described below. The initial guess is modified in subsequent iterations.

During the current iteration (which can be the initial iteration or a particular subsequent iteration, at block 620, the client dataset from the current iteration is retrieved from DB 604. The retrieved client dataset is referred to as the current client dataset and includes current input data, a current process flow, and current output data, any of which can be modified by training data. The current client dataset is evaluated. The evaluation compares the current output data to the desired output data. If the evaluation error is below a threshold, the client dataset is determined by the evaluation to be acceptable.

In one or more embodiments, if the evaluation indicates the current client dataset is acceptable, the output of the current client dataset is shown to the user at block 620. The user can provide input to indicate if the current client dataset is acceptable to the user. If the current client dataset is confirmed by the user to be acceptable, the current client dataset (e.g., the output) is considered to be valid and can be used, such as in flow 300 of FIG. 3 (other than blocks 302 or 320).

In one or more embodiments, the user is not consulted for feedback and the process proceeds autonomously without user feedback. The results of the evaluation are used without the need for user feedback.

Block 622 is performed whether or not the evaluation of current client dataset by block 620 is successful or the user confirmed the current client dataset to be acceptable. At block 622, the current client dataset is stored as a validation entry in valid results DB 614 with an indication of whether it is valid or not based on results of the evaluation and user confirmation.

If the evaluation is unsuccessful or the user does not confirm the current client dataset to be acceptable, the method continues at block 621. At block 621, intersection data is found by accessing data related to the current client dataset stored in the trained data DB 612, log data server 612, output data server 114, and app data server 116 that matches data in the current client dataset or is related to the matching data (such as having the same execution session ID, development session ID, etc.). The intersection data is stored in intersection data DB 625.

At block 626, data stored on intersecting data DB 625 is compared with valid validation entries in valid results DB 614 to evaluate if there is a match. At block 616, results (labeled N1 and Y1) of the evaluation at block 626 are used to update valid results DB 614. If it is determined at block 626 that there is no match (indicated in FIG. 6A as N1), the method continues at block 630. At block 630, AI frameworks are applied to the current client dataset, the integration data, and/or relevant valid results stored in valid results DB 614. One or more best AI generated solutions for the current client dataset are selected. Examples of AI frameworks include MS Cognitive Toolkit™, PyTorch™ and Tensor Flow™, without limitation to particular AI frameworks. The AI frameworks can apply a neural network. The AI generated solutions are stored in await ML conversion DB 608, and the process continues at block 650 of ML server set 108B. Still in the current iteration, block 628 of AI server set 108A waits for ML results from block 680 of ML server set 108B.

The AI frameworks can seek fundamental variables to adjust in an AI solution for which adjustment has the greatest effect at approaching an AI evaluation error of zero, wherein the AI evaluation error is an error between the desired output and the output achieved by the AI solution(s). The AI solution is a transformation set determined using AI frameworks that has an input dataset, a target dataset and a process flow (or programming block) that transforms the input dataset into the target dataset. The output is the target dataset.

If it is determined at block 626 that there is a match (indicated in FIG. 6A as Y1), the matching AI solution is stored in await ML convergence DB 608, and the process continues at block 650 of ML server set 108B to check for convergence. Still in the current iteration, block 628 of AI server set 108A waits for ML results from block 680 of ML server set 108B.

Once an ML solution is provided from block 680, a validation process is performed by AI set 108A. Validation can include repeating the comparison performed at block 626. The ML solution is a transformation set determined using ML frameworks that has an input dataset, a target dataset and a process flow (or programming block) that transforms the input dataset into the target dataset. The output is the target dataset.

At block 616, results (labeled N2 and Y2) of the repeated evaluation at block 626 are used to update valid results DB 614. This time, if it is determined at block 626 that the ML solution matches a valid validation entry (indicated in FIG. 6A as Y2), then at block 630 the error for the ML solution newly stored in valid results DB 614 is compared against error for previous iterations of potential AI solutions tested by applying the AI frameworks (e.g., stored in await ML convergence DB 608), and the best solution is selected. The error compared is the difference between the output obtained using the ML solution or AI solution being tested and the desired output.

If validation fails, at block 606 control of a next AI iteration is performed. A next iteration of block 602 is performed in which a new guess for a client dataset is received. Control block 606 can select the client data set to use for the new guess, such as by suggesting the best solution of the ML and AI solutions tested (possibly with an adjustment to a fundamental variable). The process can continue by performing additional iterations until both convergence by ML set 108B and validation by AI set 108A are achieved or a timeout condition occurs.

Validation failure can occur, for example, due to failure to find a match at block 626 (indicated in FIG. 6A as N2) or a determination that the error associated with the ML solution and the AI solutions exceeds a predetermined threshold.

If validation is successful, the AI and/or ML solution(s) that resulted in the lowest error and/or outperformed the other solutions are used to generate new training data that is stored in training data DB 612 and to add one or more new entries to dictionaries 610. The proper contextual dictionary 610A-610N for storing the new entry can be selected based on context of the initial client dataset submitted.

With reference to the convergence process performed by ML set 108B, at block 650, ML Proposed Solutions DB 660 is updated with the results last added to await ML convergence DB 608 following application of AI frameworks at block 630.

At block 670, data awaiting ML convergence processing is obtained from ML Proposed Solutions DB 660 and processed using ML frameworks (also referred to as tools) to determine associated ML error for various ML frameworks and solutions being tested. ML frameworks can include different frameworks, for example, ML/NET™ Accord.Net™, PyTorch™, without limitation to particular ML frameworks. There can be multiple ML solutions used with each framework and its modules, such as by using ML solutions in which variables (e.g., fundamental variables)

are adjusted to provide a different model. Different frameworks, modules, and models can be tested until convergence is found.

At block 680 a determination is made whether convergence has been found. Convergence is tested by determining an ML error, which is a difference between the output of each ML solution and the desired output. Convergence is found when the ML error satisfies a criteria, such being near to zero or below a predetermined threshold. Block 680 notifies block when convergence is found in order for the testing to stop at block 670. The ML solution(s) that produced the acceptable error are provided to block 626 for updating valid results DB 614 with the ML solution. Block 626 determines whether there is a match between the ML solutions and valid results in valid results DB 614 and follows the branches N2 and Y2 as described previously.

Examples of ML techniques applied for evaluating convergence include, without limitation, matrix evaluation of norms or mathematical models that may perform a transformation or a combination of transformations. Some examples of transformation include, without limitation, Gaussian transforms, Fourier/fast Fourier transforms, la place transforms, standard linear and nonlinear equations, standard algebraic equations, standard derivatives, partial derivatives and integrals, chaos-based mathematics, and matrix analysis via eigenvalues.

Convergence can be achieved in multiple forms. In a first form, ML set 108B first models the input and target data sets (e.g., with a transfer function) by trial and error, then uses this model to determine if convergence is possible, such as by searching stability points. The stability points are values in the output from the model used that do not change much (meaning ML error is below a predetermined threshold, indicating change is within a predefined tolerance range) for the different trials used (e.g., each trial using a different transfer function). The transfer function can be, for example a La Place transfer function, Gaussian Function, or any mathematical or statistical methods.

In a second form, when stability points are not found, a matrix can be created with random values (text (wherein the text is represented as an ASCII code) or numeric), and a matrix norm is calculated in two dimensions. A distance between the iterated matrices can be determined, e.g., using a matrix norm. If the difference between random values produce during the current iteration and a previous iteration is sufficiently low, indicating a reduction of overall error, convergence is found. If the difference between the random values for the current and previous iteration is not sufficiently low, then the convergence fails after a predefined amount of iterations. The matrix norm can be, for example, a Frobenius Norm.

When determining AI or ML error or determining whether an AI or ML solution matches a different solution (such as an entry in valid results DB 614), a desired output data (provided by the user or by trained data) is compared to output generated by an AI or ML model or framework based on a common input dataset. When comparing letters, a match is determined based on how closely an expected word or letter is matched; when comparing numbers, a match is determined based on a difference approaching a value of zero; when comparing a graphical sets, a match is determined based on evaluation of pixels as numbers.

If no convergence is found at block 680, block 680 provides a slightly different ML solution (e.g., by changing one or more variables, e.g., fundamental variables) as a new ML solution to be tested to block 650. Thus an inner loop is performed each time block 650 is repeated for retraining data using a new ML solution. Block 650 can determine differences between the new ML solutions presented to block 650 and the input to block 650, e.g., for a previously performed loop, to determine where matching fails. Block 650 provides expected matched outputs, block 680 generates unmatched outputs, and the differences (meaning errors) are calculated. The differences are stored on ML Proposed Solutions DB 660. Matrix analysis is performed at block 685 to determine changes to apply to a new ML solution to be used for the next loop.

Matrix analysis can be performed using an equation, such as example Equation (1):

$$\text{Convergence}(D) = \min_{\substack{n \to \infty \\ m \to \infty}} \left[ \sum_{m=1}^{\infty} D \sum_{n=1}^{\infty} P(m) \min(f([\text{Guess}(x_n) - \text{Result}(p_m)])) \right] \quad \text{Equation (1)}$$

Where:
D=Any data set
P=Any parameter in a dataset
f=a statistical function with sigma-4 certainty
Guess=Dictionary parameter for a given user/region/office/schema
m=number of parameters in a user/region/office/schema
x=Possible solutions in a Dictionary
n=number of items in a dictionary for any user/region/office/schema
Result=desired result for a given user/region/office/schema for a parameter in any dataset If ML set B 108B does not detect convergence in a subsequent iteration, AI set 108A can select new adjustments to apply to selected variables (e.g., fundamental variables) to be used for a next iteration. The process can continue autonomously and indefinitely, with AI set 108A exploring adjustment of different variables and different dictionary entries.

At block 602, AI set 108A can randomly or methodically select a dictionary entry from dictionary 610. The selected dictionary selection can be adjusted (such as a modification to any of the input data set, output dataset, or process flow) and provided as an initial client dataset. When processing of the dictionary entry is completed, a next dictionary entry can be selected and modified, allowing for continuous, autonomous operation to explore application of possible different models and adjusted parameters for the available dictionary entries.

Figure 7:
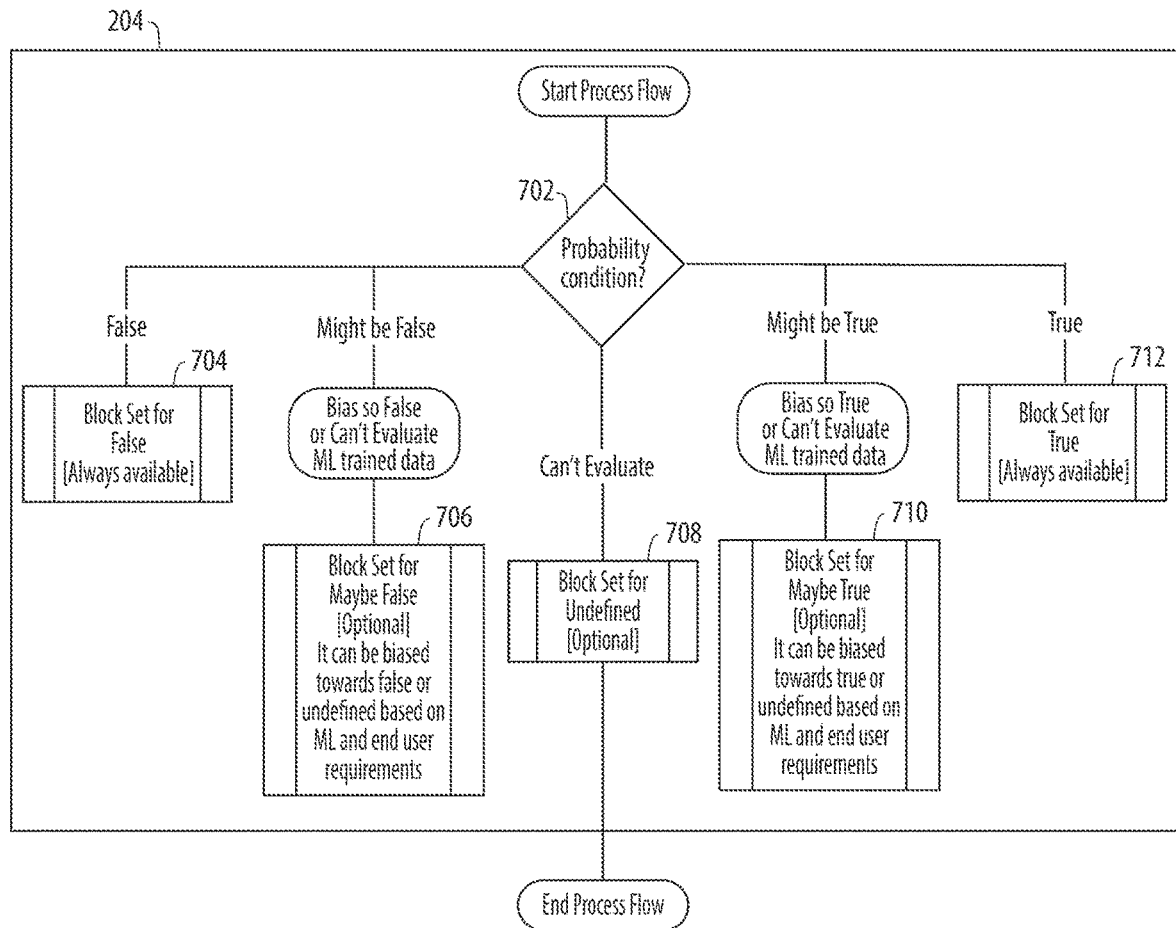
FIG. 7 is a flow diagram for implementing an example method during development and/or execution of a process flow for suggesting programming blocks to include or be executed in the processing flow using a probabilistic tree-diagram, in accordance with embodiments of the disclosure.

With reference to FIG. 7, a probability condition is applied using a probabilistic tree diagram for selecting a next programming block to be added to the process flow during development or execution of the process flow.

The probability condition includes a determination of probability of truth (along a spectrum of choices related to truth, false, and undetermined) that a dataset matches a particular condition associated with input or output to or from a programming block. The probability can be determined using machine learning techniques applied with datasets to permutations of process flows by AI server set 108. In the example shown, next programming blocks 704, 706, 708, 710, or 712 are selected to be executed based on results from AI server set 108 indicating a probability of truth along the spectrum of choices that the dataset matches the particular condition. Based on the results for this match, the probability is ranked, e.g., between False, Undetermined and True, for selecting a probability condition.

In the example provided in FIG. 7, five possible probability conditions are shown.

The first probability condition is "IF X is false," wherein X is the particular condition under consideration. Programming block set 704 is executed (during execution) or selected to be included (during development). A programming block set can include a programming block, a path of programming blocks, a process flow, or another probabilistic tree diagram. This condition would occur, for example when none of a structure of the target dataset matches any part of a structure of the input dataset. In this case the elements being evaluated in the condition statement are not compatible, (e.g., trying to compare a string with characters and no numbers to a number).

The second probability condition is "IF X is likely true." Programming block set 710 is executed (during execution) or selected to be included (during development) when the condition is partially or incompletely satisfied. (e.g., some of the elements in the condition may fail the condition). This condition would occur, for example when the structure of the target dataset has a portion that matches the structure of the input dataset but is lacking structure to match a remaining portion of the input dataset.

The third probability condition is an undefined condition, such as when an evaluation cannot be performed. Programming block set 708 is executed (during execution) or selected to be included (during development) when it is unevaluated whether the condition is satisfied. This condition would occur, for example when one of the datasets is empty.

The fourth probability condition is "IF X is likely false." Programming block set 706 is executed (during execution) or selected to be included (during development) when the fourth probability is satisfied. In this event, the condition is mostly false, some of the elements that are being evaluated in the condition may match a few fields, though none of the elements have a full match between the elements being compared. This condition would occur, for example when a portion of the structure of the target dataset matches all of the structure of the input dataset but a remaining portion of the target dataset does not match the structure of the input dataset.

The fifth probability condition is "IF X is true." Programming block set 712 is executed (during execution) or selected to be included (during development). In this event, the elements clearly are compatible, and the condition is fully and completely satisfied. This condition would occur, for example when all of the structure of the target dataset matches all of the structure of the input dataset. In one or more embodiments, code generation during process flow development can be managed. Suggestions can be made for a transformation problem, such as data fields to use in a particular database for an input, intermediary, or target dataset and/or a coding solution. In an example transformation problem, a solution is needed for transforming an input dataset stored using Excel™ (which uses columns and fields into an XML structure. An analysis is made regarding the degree of similarity between different fields and columns. A programming block and/or process flow can be recommended by guessing which entry to select from one of dictionaries 610 based on machine learning analysis of logged information (including failures, successful modifications, etc.) for previously implemented solutions. The machine learning techniques can try to associate dissimilar data, such as by applying multivariate analysis using a mathematical model provided by successful solutions executed by other users or generated from different machine learning libraries. AI can be applied using AI set 108*a* and ML set 108B until convergence and validation are achieved, upon which a recommendation is made to a user with a solution.

For example, changes to parameters of a process flow or programming block over time by one or more users that authored the modifications can be detected. The different values for these parameters tried by the user(s), such as slight modifications to the values, can be provided as training data from training DB 312 having adjusted parameters to ML set 108B. ML set 108B can receive and analyze multiple iterations of the training data using machine language techniques and determine optimal values for the parameters by identifying the parameter values that demonstrate best convergence. This would indicate that the optimal values would be particular suitable for accomplishing the tasks of the users that authored the modifications.

In an example, enhancements of process flows or programming blocks that can be suggested using the disclosed machine language techniques for a data transformation solution include can include upscaling graphical datasets and recognition of graphical representation techniques. The upscaling by a suggested factor is used to enhance a graphical dataset so that it can be analyzed by an optical graphical character recognition (OGCR) application for converting the graphical data to text or graphics (using a tool, such as, without limitation, Wu Transfer Moments). In this way, a graphical representation in an input dataset can be transformed into an intermediary dataset, such as a (proper) vector graphics dataset. Based on the vector graphics datasets, characters or shapes can be properly recognized and recreated accurately for a target dataset.

For example, in a client dataset, the input dataset can include a graphical dataset and the process flow of the client dataset can be configured to perform OGCR on the graphical dataset. At least one of the AI tools and the ML tools suggest an upscaling factor for upscaling the graphical dataset. The process flow is modified so that during execution of the process flow, before the OGCR is performed, an intermediary dataset is generated that is upscaled based on the upscaling factor, and then the OGCR is performed on the intermediary dataset.

Accordingly, the integrated development and execution environment, when supported by AI server sets 108, enables and enhances collaboration between users. The users can be situated in different geographic locations and/or work at different times. Problem solving for generation of solutions by one user can be available to another user. The user can locate candidate solutions by searching and browsing through a global or local directory that is populated by dictionaries 610. Machine learning techniques can be leveraged to recognize parameters that a user is working with, try different solutions using different values for these parameters and identify a best solution and parameter values used through detection of convergence.

With reference to FIG. 8, a block diagram of an example computing system 800 is shown, which provides an example configuration of the processing components of data transformation system 100, namely client machine(s) 102, web server(s) 104, applications server(s) 106, AI servers of AI server set 108, log server(s) 112, output data server 114, and application data server(s) 116. Additionally, all or portions of the processing components of data transformation system 100 could be configured as software, and computing system 800 could represent such portions. Computing system 800 is only one example of a suitable system and is not intended to suggest any limitation as to the scope of use or functionality of embodiments of the disclosure described herein. Computing system 800 can be implemented using hardware, software, and/or firmware. Regardless, computing system 800 is capable of being implemented and/or performing functionality as set forth in the disclosure.

Computing system 800 is shown in the form of a general-purpose computing device. Computing system 800 includes a processing device 802, memory 804, an input/output (I/O) interface (I/F) 806 that can communicate with an internal component, such as a user interface 810, and optionally an external component 808.

The processing device 802 can include, for example, a programmable logic device (PLD), microprocessor, DSP, a microcontroller, an FPGA, an ASIC, and/or other discrete or integrated logic circuitry having similar processing capabilities.

The processing device 802 and the memory 804 can be included in components provided in the FPGA, ASIC, microcontroller, or microprocessor, for example. Memory 804 can include, for example, volatile and non-volatile memory for storing data temporarily or long term, and for storing programmable instructions executable by the processing device 802. Memory 804 can be a removable (e.g., portable) memory for storage of program instructions. I/O I/F 806 can include an interface and/or conductors to couple to the one or more internal components 810 and/or external components 808.

Processing device 802 can optionally include one or more neural network 820 and/or GPU 830. Neural network(s) 820 and GPU 830 are shown in dotted lines to indicate they are specific to certain embodiments. In an embodiment that includes AI sets 108A and 108B, AI set 108A includes one or more neural network 820 and GPU 830, and ML set 108B includes GPU 830.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of data transformation system 100 may be implemented or executed by one or more computer systems, such as a microprocessor. Each computer system 800 can be included within processing components of data transformation system 100, or multiple instances thereof. In the example shown, computer system 800 is embedded in the processing components of data transformation system 100. In various embodiments, computer system 800 may include one or more of a microprocessor, an FPGA, application specific integrated circuit (ASIC), microcontroller. The computer system 800 can be provided as an embedded device. Portions of the computer system 800 can be provided externally, such by way of a centralized computer, a data concentrator, a cockpit computing device controls display of gap status, e.g., notifications about the gap or alerts, or the like.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus.

Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The scope of the present disclosure is not limited to the specific embodiments described in the disclosure. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the disclosed aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

We claim:

1. A method implemented by a computer system using artificial intelligence (AI), the method comprising:
receiving by AI tools in a first iteration an initial transformation set and in at least one respective subsequent iteration a trained transformation set, each of the initial and trained transformation sets having components that include an input dataset, a target dataset, and a process flow to transform the input dataset into the target dataset for solving an industrial data transformation problem;
iteratively modifying by the AI tools, by the subsequent iterations, at least one of the components of the transformation set using training data generated using the AI tools, the AI tools having a capability of generating the training data to modify each and any one of the components of a trained transformation set received from a previous iteration to generate a trained transformation set of the trained transformation sets;
for each subsequent iteration, comparing the components of a trained transformation set generated by the subsequent iteration to like components of trained transformation sets of previous iterations of the initial iteration and the subsequent iterations and to intersecting data using like components of history data stored from execution or development of process flows over time; and
selecting a trained transformation set generated by one of the subsequent iterations for solving the industrial data transformation problem if a suitable match is found based on the comparison.

2. The method of claim 1, further comprising, for each iteration:
applying machine learning (ML) tools to the trained transformation set to propose ML solutions that model transformation sets; and
seeking convergence for the ML solutions.

3. The method of claim 2, further comprising:
validating the converged ML solutions; and
if the suitable match is not found, the validation is not successful, or the convergence fails, applying the AI tools to generate training data for a next iteration.

4. The method of claim 2, further comprising, for each iteration, receiving user feedback when available, wherein the user feedback indicates whether the initial or trained transformation set corresponding to the iteration is acceptable to a user, and the user feedback is stored in association with the corresponding initial or trained transformation set and used for solving subsequent industrial data transformation problems.

5. The method of claim 3, wherein the AI tools identify fundamental variables of the transformation set that most influence convergence and/or validation.

6. The method of claim 5, wherein the identification of fundamental variables uses a Latin Square algorithm.

7. The method of claim 3, wherein the input dataset of the trained transformation set includes a graphical dataset and the process flow of the trained transformation set is to perform optical graphical character recognition (OGCR) on the graphical dataset, and the method further comprises:
suggesting by at least one of the AI tools and the ML tools an upscaling factor for upscaling the graphical dataset; and
configuring the process flow of the trained transformation set to generate an intermediary dataset that is upscaled based on the upscaling factor and to perform the OGCR on the intermediary dataset.

8. The method of claim 7, wherein the intermediary dataset is a vector graphics dataset or a proper vector graphics dataset.

9. The method of claim 1, wherein the history data includes one or more of output data from execution of process flows by a community of users over time, logged data about experiences of the community of users developing or executing process flows over time, and application data about intermediate results when developing or executing process flows over time.

10. The method of claim 1, wherein the AI tools use neural networks to identify and modify the transformation set.

11. The method of claim 2, wherein the AI tools include one or more of Microsoft® Cognitive Toolkit™, PyTorch®, and TensorFlow® and the machine learning (ML) tools include one or more of ML.Net™, PyTorch, and Accord.Net™.

12. The method of claim 2, wherein the convergence uses at least one of matrix analysis, Gaussian transforms, Fourier or fast Fourier transforms, la place transforms, and matrix analysis.

13. The method of claim 1, wherein a process flow of a transformation set of one of the iterations includes at least first and second programming blocks, the first and second programming blocks each having an input block and an output block, wherein the first and second programming blocks are compatible for an execution designation that the first and second programming blocks are to be executed consecutively during execution when the output block of the first programming block is compatible for passing data to the input block of the second programming block, the method further comprising selecting one of the first and second programming blocks to be included in the process flow or to be recommended to a user for inclusion in the process flow, including selecting the one of the first and second programming blocks from candidate programming blocks based on a probability of compatibility for passing data during execution between the output block of the first programming block and the input block of the second programming block.

14. The method of claim 13, further comprising applying machine learning to determine the probability of compatibility.

15. The method of claim 13, further comprising determining an opportunity for recommending the one of the first and second programming blocks based on a determination about user behavior and/or user actions during development or execution of the other of the first and second programming blocks and/or execution problems encountered during execution of the other of the first and second programming blocks.

16. The method of claim 1, wherein log data associated with a process flow of a transformation set of one of the iterations or a programming block of the process flow includes at least one of time stamped information associated with development or execution of the programming block or process flow per user about user action data, user behavior data, warning data, error and/or success data, user feedback data, content of any associated dialogs, and application data includes at least one of input data and intermediate and/or temporary information data generated during development or execution of the programming block or process flow.

17. The method of claim 16, wherein the user behavior data is based on user interaction with a graphical user interface (GUI) when developing or executing the process flow or the programming block.

18. The method of claim 17, wherein the method further includes receiving interrupt signals from a user input device (UID), wherein the user interaction with the GUI is determined from the interrupt signals.

19. The method of claim 17, wherein the user behavior is further determined using machine learning to determine user sentiment based on correlations between user interaction with the GUI and the log data and/or application data.

20. The method of claim 1, further comprising notifying an author user that developed a programming block or process flow about log data and/or application data indicative of problems encountered by other users during execution of the programming block or process flow.

21. The method of claim 1, wherein the method is performed autonomously and wherein the process flow includes a plurality of modular programming blocks.

22. The method of claim 21, further comprising:
autonomously providing a next initial transformation set; and
autonomously repeating the method with the next initial transformation set.

23. A transformation system, the transformation system comprising:
AI tools having;
a memory configured to store a plurality of programmable instructions; and
at least one processing device in communication with the memory, wherein the at least one processing device, upon execution of the plurality of programmable instructions is configured to:
receive in a first iteration an initial transformation set and in at least one respective subsequent iteration a trained transformation set, each of the initial and trained transformation sets having components that include an input dataset, a target dataset, and a process flow to transform the input dataset into the target dataset for solving an industrial data transformation problem; iteratively modify by the AI tools, by the subsequent iterations, at least one of the components of the transformation set using training data generated using the AI tools, the AI tools having a capability of generating the training data to modify each and any one of the components of a trained transformation set received from a previous iteration to generate a trained transformation set of the trained transformation sets;
for each subsequent iteration, compare the components of a trained transformation set generated by the subsequent iteration to like components of trained transformation sets of previous iterations of the initial iteration and the subsequent iterations and to intersecting data using the like components of history data stored from execution or development of process flows over time; and
select a trained transformation set generated by one of the subsequent iterations for solving the industrial data transformation problem if a suitable match is found based on the comparison.

24. A method implemented by a computer system using artificial intelligence (AI) for solving industrial data transformation problems, the method comprising:
a. receiving in a first iteration an initial transformation set including an input set, a target dataset, and a process flow for transforming the input dataset into the target dataset, the process flow being obtained from at least one dictionary in a first iteration;
b. receiving in at least one respective subsequent iteration a trained transformation set using training data that modifies at least one of the input dataset, the target dataset, and the process flow of a transformation set from a previous iteration; and
c. for each iteration of the at least one respective subsequent iteration: c1 receiving user feedback when available, the user feedback indicating whether the initial or trained transformation set corresponding to the iteration is acceptable to a user;

c2. updating a valid results database with the user feedback, if received, in association with the corresponding initial or trained transformation set;

c3. if user feedback indicating that the process flow was unacceptable, or responsive to not receiving user feedback, seeking a match between results in the valid results database and intersecting data from training data previously generated over time, output data from execution of process flows by a community of users over time, logged data about experiences of the community of users developing or executing process flows over time, and application data about intermediate results when developing or executing process flows over time;

c4. if a match is found, proposing machine learning (ML) solutions using ML tools until convergence can be found for an ML solution transformation set;

c5. if convergence is found for the ML solution transformation set, validating the ML solution transformation set based on whether or not it matches data in the valid results database;

c6. if the validation is successful, updating the validation results database to indicate successful convergence and validation, updating the training data and at least one dictionary to include the ML solution transformation set as available for current use and for future use to find program flows as solutions to data transformation problems; and c7. if the match is not found in step c3, the validation is not successful at step c5, or the convergence fails, c7a. using AI tools to generate the training data to modify at least one of the process flow, input dataset, and target dataset of a next trained transformation set; and c7b. providing the next trained transformation set to be the trained transformation set received at operation b.

* * * * *